US012690063B2

(12) United States Patent
Ryu et al.

(10) Patent No.: US 12,690,063 B2
(45) Date of Patent: Jul. 21, 2026

(54) TECHNIQUES FOR SIDELINK CHANNEL SENSING WITH MINI-SLOTS

(71) Applicant: QUALCOMM Incorporated, San Diego, CA (US)

(72) Inventors: Jung Ho Ryu, Fort Lee, NJ (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 518 days.

(21) Appl. No.: 17/969,548

(22) Filed: Oct. 19, 2022

(65) Prior Publication Data

US 2024/0137975 A1     Apr. 25, 2024
US 2024/0237061 A9     Jul. 11, 2024

(51) Int. Cl.
*H04W 74/0808*     (2024.01)

(52) U.S. Cl.
CPC .............................. *H04W 74/0808* (2013.01)

(58) Field of Classification Search
CPC .. H04W 74/0808; H04W 72/25; H04W 72/40
USPC ......................................................... 370/329
See application file for complete search history.

(56) References Cited

U.S. PATENT DOCUMENTS

2020/0178256 A1 *   6/2020   Tang ................. H04W 72/0453
2021/0051525 A1 *   2/2021   Cao ....................... H04W 76/14

2022/0287086 A1     9/2022   Hwang et al.
2022/0295514 A1     9/2022   Shin et al.
2024/0129936 A1 *   4/2024   Ganesan ............... H04W 72/40
2025/0142595 A1 *   5/2025   Deng ................... H04L 27/2607
2025/0159697 A1 *   5/2025   Guo ....................... H04W 72/40

FOREIGN PATENT DOCUMENTS

WO     WO-2022080415 A1     4/2022

OTHER PUBLICATIONS

International Search Report and Written Opinion—PCT/US2023/074588—ISA/EPO—Nov. 28, 2023.

* cited by examiner

*Primary Examiner* — Chandrahas B Patel
*Assistant Examiner* — Meheret Woldegebreal Kidane
(74) *Attorney, Agent, or Firm* — Holland & Hart LLP

(57)     ABSTRACT

Methods, systems, and devices for wireless communications are described. A user equipment (UE) may receive an indication of a first slot-related channel sensing procedure to perform during channel sensing. The first slot-related channel sensing procedure may be one of multiple available slot-related channel sensing procedures. The first slot-related channel sensing procedure may indicate time interval increments in which to perform the channel sensing. The UE may perform the first slot-related channel sensing procedure based on the indication. The UE may perform the first slot-related channel sensing procedure in the time interval increments of a sidelink resource pool to identify a first time-frequency resource of the sidelink resource pool that is available for transmission of a sidelink message.

30 Claims, 12 Drawing Sheets

710

720

715

705

700

Communications Manager

Sensing Procedure Indication Component

825

Receiver

810

Channel Sensing Component

830

Transmitter

815

Sidelink Message Component

835

820

805

800

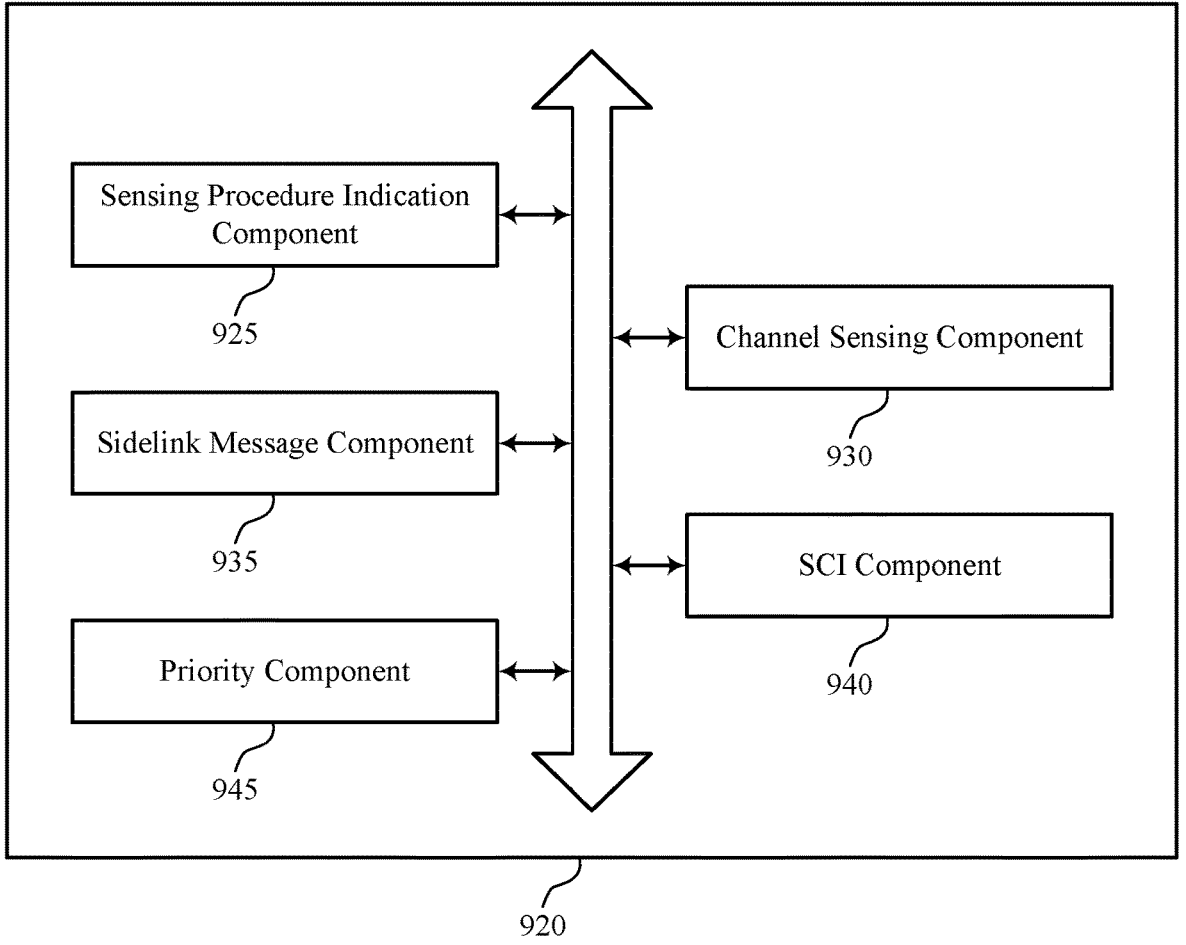
FIG. 9

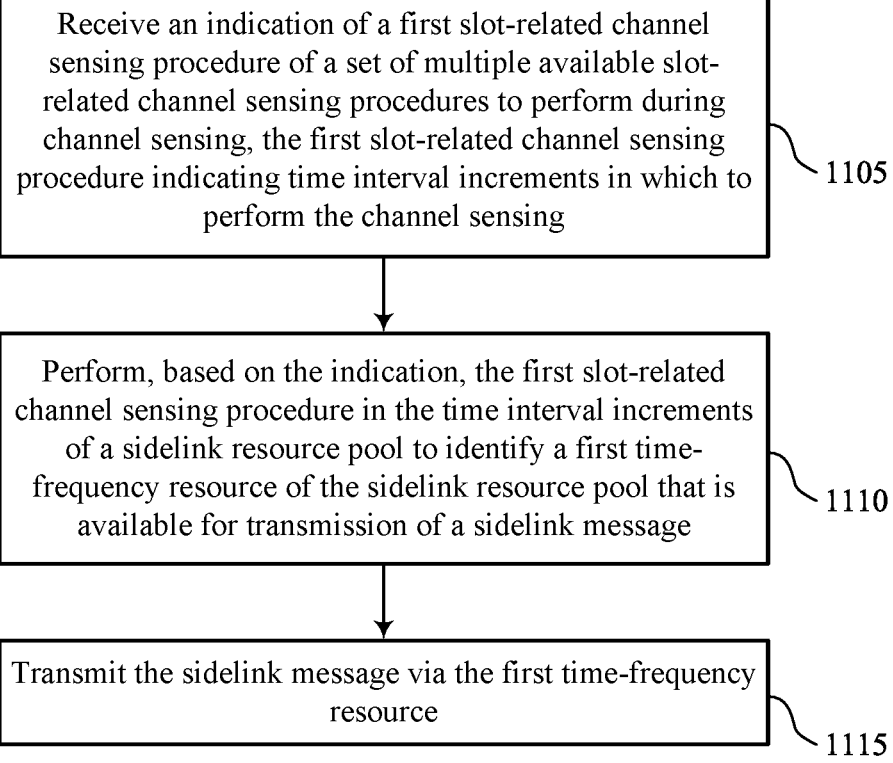

Receive an indication of a first slot-related channel sensing procedure of a set of multiple available slot-related channel sensing procedures to perform during channel sensing, the first slot-related channel sensing procedure indicating time interval increments in which to perform the channel sensing — 1105

Perform, based on the indication, the first slot-related channel sensing procedure in the time interval increments of a sidelink resource pool to identify a first time-frequency resource of the sidelink resource pool that is available for transmission of a sidelink message — 1110

Transmit the sidelink message via the first time-frequency resource — 1115

TECHNIQUES FOR SIDELINK CHANNEL SENSING WITH MINI-SLOTS

FIELD OF TECHNOLOGY

The following relates to wireless communications, including techniques for sidelink channel sensing with mini-slots.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more network entities, each supporting wireless communication for communication devices, which may be known as user equipment (UE). Some communications systems may support channel sensing procedures to identify available resources of a shared radio frequency spectrum band. In some cases, existing techniques for channel sensing procedures may be deficient.

SUMMARY

The described techniques relate to improved methods, systems, devices, and apparatuses that support techniques for sidelink channel sensing with mini-slots. For example, the described techniques provide a framework for channel sensing procedures that accommodate slot-based and mini-slot-based channel sensing, which may also be referred to as sub-slot-based channel sensing. For example, a user equipment (UE) may receive an indication of a first slot-related channel sensing procedure to perform during channel sensing. The first slot-related channel sensing procedure may be one of multiple available slot-related channel sensing procedures. In some examples, the first slot-related channel sensing procedure may indicate time interval increments in which to perform the channel sensing. The UE may perform the first slot-related channel sensing procedure based on the indication. For example, the UE may perform the first slot-related channel sensing procedure in the time interval increments of a sidelink resource pool to identify a first time-frequency resource of the sidelink resource pool that is available for transmission of a sidelink message. The present disclosure may promote improvements to sidelink channel sensing procedures, among other benefits.

BRIEF DESCRIPTION OF THE DRAWINGS

FIG. 9 illustrates a block diagram of a communications manager that supports techniques for sidelink channel sensing with mini-slots in accordance with one or more aspects of the present disclosure.

FIGS. 11 and 12 illustrate flowcharts showing methods that support techniques for sidelink channel sensing with mini-slots in accordance with one or more aspects of the present disclosure.

DETAILED DESCRIPTION

Figure 1:
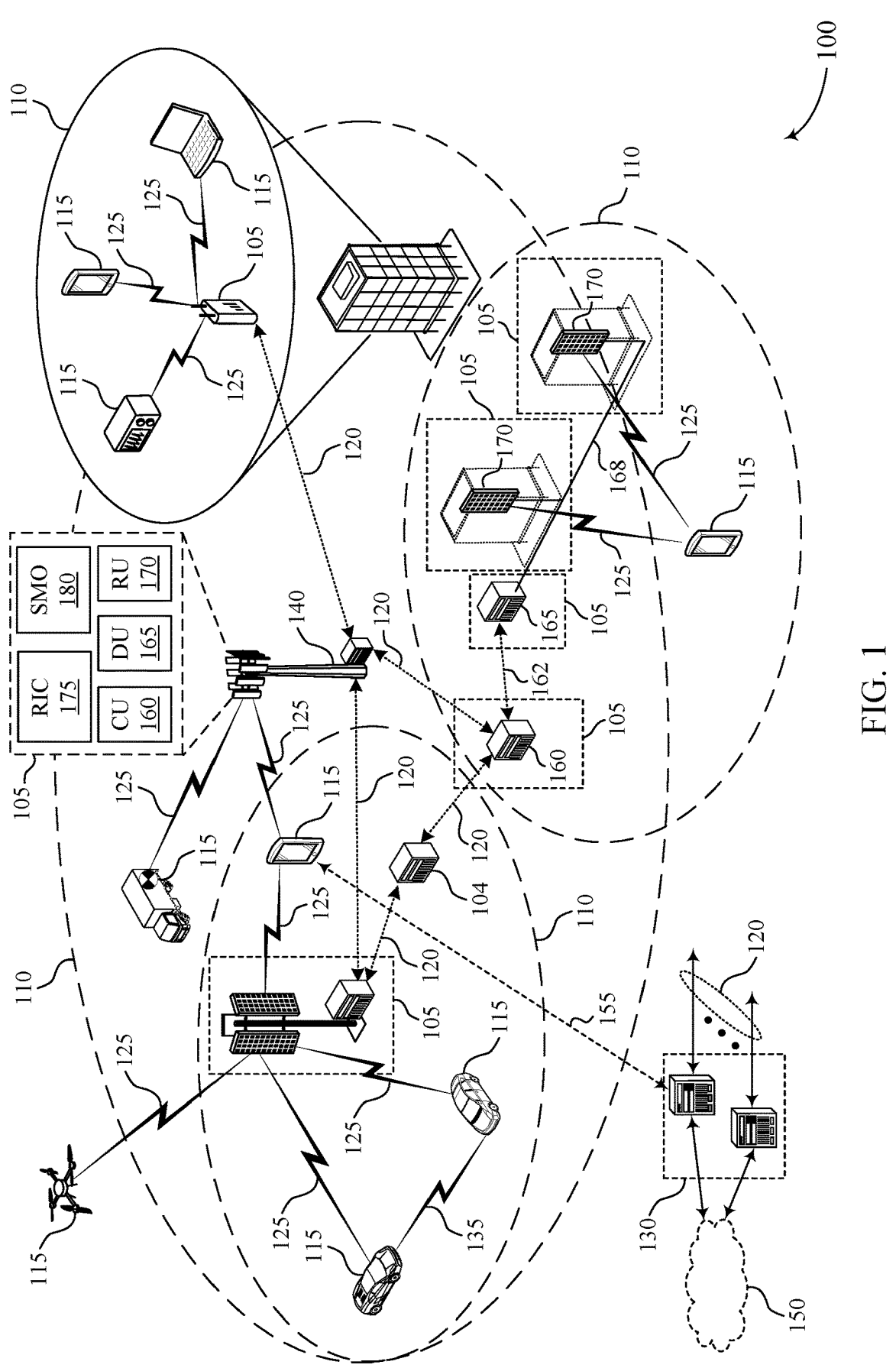
FIGS. 1 and 2 each illustrate an example of a wireless communications system that supports techniques for sidelink channel sensing with mini-slots in accordance with one or more aspects of the present disclosure.

Some wireless communications systems may include communication devices, such as user equipment (UE) and network entities, that support wireless communications using one or more radio access technologies (RATs). For example, the communication devices may support wireless communications using one or multiple cellular RATs, such as fourth generation (4G) systems (e.g., Long Term Evolution (LTE) systems), and fifth generation (5G) systems (e.g., New Radio (NR) systems), among other generations of cellular RATs, including subsequent generations of cellular RATs. In some examples, such wireless communications systems may support sidelink communications using a shared radio frequency spectrum band (e.g., an unlicensed radio frequency spectrum band, an unlicensed band). The shared radio frequency spectrum band may be shared between cellular RATs and one or more other RATs, such as Wi-Fi or Bluetooth, among other examples. In such examples, prior to using resources of the shared radio frequency spectrum band for a transmission, a communication device may perform a channel sensing procedure.

For example, a UE may perform a channel sensing procedure to determine a set of time-frequency resources that may be available (or unavailable) for a sidelink transmission. In some examples, a higher layer (e.g., a medium access control (MAC) layer) of a protocol stack at the UE may trigger a lower layer (e.g., a physical (PHY) layer) of the protocol stack to determine the set of available time-frequency resources from a resource pool. The resource pool may include multiple time-frequency resources that may be used for sidelink transmissions. The lower layer may determine the set of available time-frequency resources from the resource pool based on sidelink control information (SCI) received from one or more other UEs. For example, received SCI may indicate time-frequency resources within the resource pool that may be reserved for sidelink transmissions at the other UEs. The reserved time-frequency resources may include a slot or a portion of a slot (e.g., a sub-slot, a mini-slot) in the time domain. That is, some UEs may be capable of transmitting sidelink messages in increments of slots or sub-slots. Although a slot is referred to throughout the present disclosure, it should be understood that techniques described herein may also apply to other time durations. In some examples, however, a channel sensing procedure may assume that sidelink transmissions occupy slots in a time domain. As such, the UE may be configured to perform the channel sensing procedure in slot-based increments. That is, the UE may be configured to exclude time-frequency resources reserved at other UEs in slot-based increments irrespective of whether the reserved time-frequency resources include a slot or a sub slot. In some examples, performing channel sensing in slot-based increments may lead to inefficient resource utilization within the wireless communication system.

Various aspects of the present disclosure generally relate to techniques for sidelink channel sensing with sub-slots, and more specifically, to a framework for channel sensing procedures that accommodates slot-based and sub-slot-based channel sensing. For example, the higher layer of the protocol stack at the UE may indicate, to the lower layer of the protocol stack at the UE, to determine resources for a slot-based or sub-slot-based transmission. That is, the higher layer may indicate, to the lower layer, to determine time-frequency resources for a sidelink transmission using increments of a slot or a sub-slot. In response, the lower layer may perform slot-based channel sensing or sub-slot-based channel sensing. For example, the UE may perform the channel sensing procedure in slot-based increments or sub-slot-based increments of a sidelink resource pool to identify time-frequency resource of the sidelink resource pool that may be available for the sidelink transmission. The UE may transmit the sidelink message using the identified time-frequency resource.

Particular aspects of the subject matter described herein may be implemented to realize one or more potential advantages. For example, the techniques employed by the described communication devices may provide benefits and enhancements to the operation of the communication devices, including improved channel sensing procedures and increased resource utilization of the shared radio frequency spectrum band. In some implementations, the operations performed by the described communication devices to increase resource utilization include using a channel sensing procedure that accommodates slot-based and sub-slot-based channel sensing. In some other implementations, operations performed by the described communication devices may also support increased throughput and higher data rates, among other benefits.

Aspects of the disclosure are initially described in the context of wireless communications systems. Aspects of the disclosure are also described in the context of timing diagrams and a process flow. Aspects of the disclosure are further illustrated by and described with reference to apparatus diagrams, system diagrams, and flowcharts that relate to techniques for sidelink channel sensing with mini-slots.

FIG. 1 illustrates an example of a wireless communications system 100 that supports techniques for sidelink channel sensing with mini-slots in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for sidelink channel sensing with mini-slots as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

In some examples, the wireless communications system 100 may support a framework for channel sensing procedures that accommodate slot-based and sub-slot-based channel sensing. For example, a UE 115 may receive an indication of a first slot-related channel sensing procedure to perform during channel sensing. The first slot-related channel sensing procedure may be one of multiple available slot-related channel sensing procedures. In some examples, the first slot-related channel sensing procedure may indicate time interval increments in which to perform the channel sensing. The UE 115 may perform the first slot-related channel sensing procedure based on the indication. For example, the UE 115 may perform the first slot-related channel sensing procedure in the time interval increments of a sidelink resource pool to identify a first time-frequency resource of the sidelink resource pool that is available for transmission of a sidelink message. In some examples, using the first slot-related channel sensing procedure to perform during channel sensing may enable the UE 115 to increase resource utilization within the wireless communications system 100, among other benefits.

Figure 2:
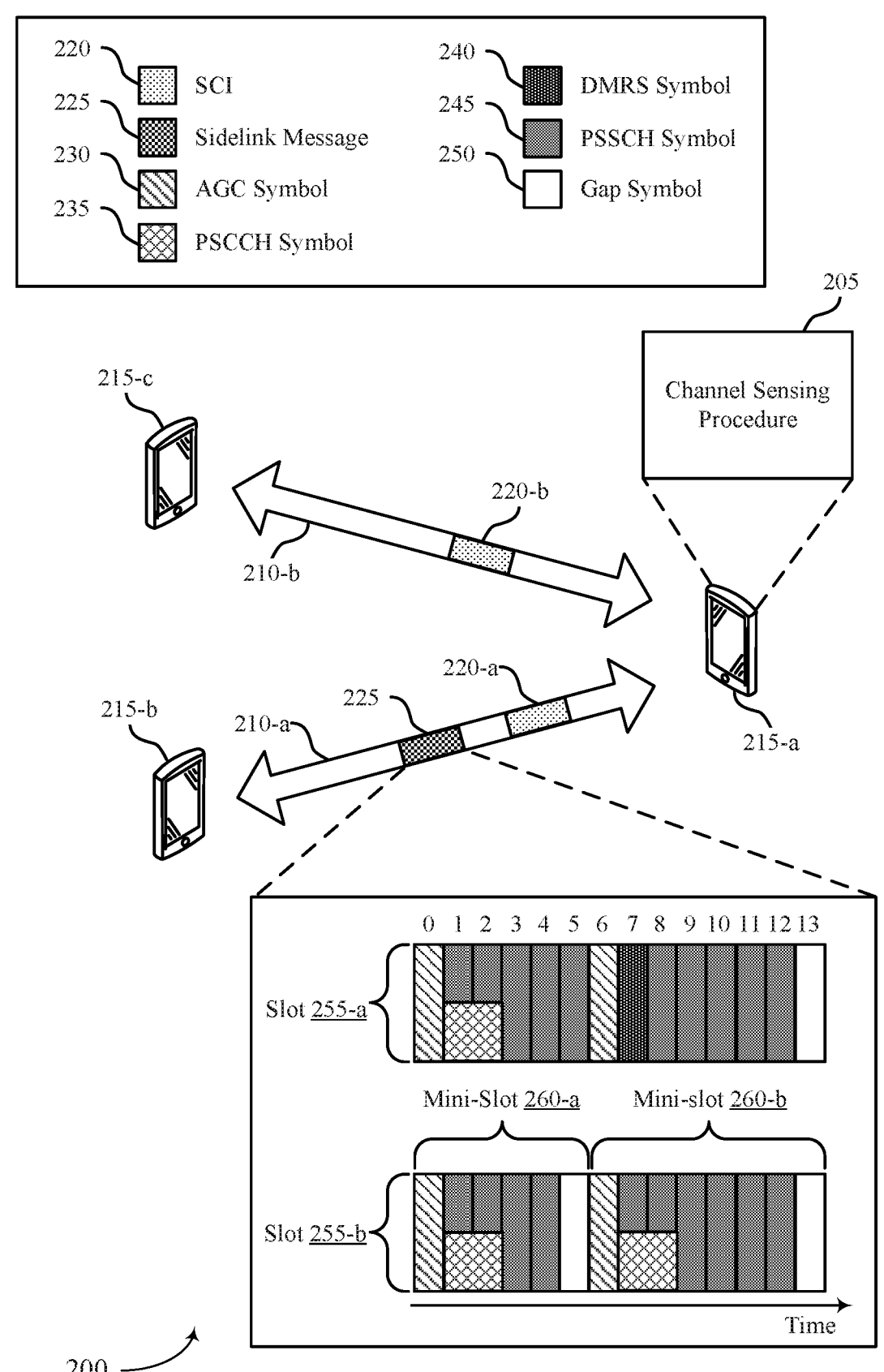

FIG. 2 illustrates an example of a wireless communications system 200 that supports techniques for sidelink channel sensing with mini-slots in accordance with one or more aspects of the present disclosure. In some examples, the wireless communications system 200 may implement aspects of the wireless communications system 100. For example, the wireless communications system 200 may include a UE 215-*a*, a UE 215-*b*, and a UE 215-*c*, which may be examples a UE 115 as described with reference to FIG. 1. In the example of FIG. 2, the UEs 215 may communicate using one or more sidelinks 210 (e.g., a PC5 interface). In some examples, the one or more sidelinks 210 (e.g., a sidelink 210-*a*, a sidelink 210-*b*) may be examples of a D2D communication link 135 as described with reference to FIG. 1.

In some examples, the wireless communications system 200 (e.g., a UE to UE network) may support one or more modes for sidelink communications. For example, the wireless communications system 200 may support Mode-1 sidelink operations and Mode-2 sidelink operations, among other examples of sidelink operation modes. As described herein, Mode-1 sidelink operations may refer to sidelink operations in which resource allocations (e.g., for sidelink communications) may be scheduled or configured using a network entity (e.g., a gNB). That is, for Mode-1 sidelink, resource utilization may be determined at a network entity. Additionally, or alternatively, as described herein, Mode-2 sidelink operations may refer to sidelink operations in which resource allocations (e.g., for sidelink communications) may be determined using a sensing procedure conducted (e.g., autonomously) at the UEs 215 (e.g., a transmitting UE). That is, in some examples, channel sensing may be used for sidelink communications, such as Mode-2 sidelink. In some examples of Mode-2 sidelink operations, the transmitting UE may perform channel sensing to determine one or more resources that may be reserved at one or more other (e.g., nearby) transmitting UEs and to select one or more resources for a transmission (e.g., a sidelink transmission) at the transmitting UE based on the channel sensing. Some channel sensing methods may be designed with an assumption that UEs (e.g., all sidelink transmit UEs) may use (e.g., reserve) resources in increments of a particular duration to transmit sidelink communications. For example, some channel sensing procedures may be based on an assumption that the UEs 215 may use a slot (e.g., full-slots, sidelink slots, some other suitable duration) to transmit sidelink communications.

As illustrated in the example of FIG. 2, the UE 215-*a* may perform a channel sensing procedure to determine (e.g., identify) resources for transmission of a sidelink message 225. In some examples of a channel sensing procedure, to determine available resources in a resource window used at a UE, the UE may receive and decode one or more SCIs from one or more other UEs (e.g., any nearby transmit UEs). For example, the UE 215-*a* may receive an SCI 220-*b* from the UE 215-*c*. In some examples, the SCI 220-*b* may include a resource reservation. Additionally, or alternatively, the SCI 220-*b* may include a priority of a transmission to be performed in the reserved resource (or multiple reserved resources). For example, the SCI 220-*b* may include a resource reservation that my indicate one or more resources reserved at the UE 215-*c* for a sidelink transmission. Additionally, or alternatively, the SCI 220-*b* may include a priority associated with the sidelink transmission to be performed at the UE 215-*c* using the reserved resources. In some examples, the UE 215-*a* may receive the SCI 220-*b* from the UE 215-*c* with a receive power (e.g., a reference signal received power (RSRP)) that may satisfy a threshold (e.g., exceed a threshold). In such examples, the UE 215-*a* may determine that the resources reserved using the SCI 220-*b* may be unavailable for the UE 215-*a* to use to transmit a sidelink message, such as the sidelink message 225. In some examples, the threshold may depend on the priority associated with the sidelink transmission to be performed at the UE 215-*c* (e.g., using the resources reserved using the SCI 220-*b*). Additionally, or alternatively, the threshold may depend on another priority associated with the sidelink transmission to be performed at the UE 215-*a* (e.g., an intended transmission, such as the sidelink message 225).

In some examples, the SCI 220-*b* (and other SCI, such as an SCI 220-*a*) may include one or more fields to indicate a resource reservation. For example, the SCI 220-*b* may include a TRA (time resource assignment) field and an FRA (frequency resource assignment) field that may indicate (e.g., reserve) a quantity of resources to be used at the UE 215-c. That is, the TRA field may indicate a quantity (and location) of resources in a time domain and the FRA may indicate a quantity (and location) of resources in a frequency domain. In some examples, a quantity of resources indicated using the SCI 220-b (or the SCI 220-a) may be determined according to a parameter, such as an sl-MaxNumPerReserve-r16 resources information element (IE). It is to be understood that the names of IEs and fields described herein may change based on implementation of one or multiple devices (e.g., one or more of the UEs 215), and the examples described herein should not be considered limiting to the scope covered by the claims or the disclosure. In some examples, the quantity of resources (e.g., 2 or 3 resources) may include one or more resources to be used for a transmission (e.g., a current transmission) that includes the SCI. For example, the UE 215-c may transmit the SCI 220-b using one or more resources reserved at the UE 215-c and indicated using the SCI 220-b. In some examples, the TRA field or FRA field may be used to reserve a quantity of resources for retransmissions (e.g., up to about 2 or some other suitable quantity of retransmission resources). In such examples, the reserved retransmission resources may occur some quantity of slots (e.g., up to about 31 slots or some other suitable quantity of slots) subsequent to a slot in which the SCI may be transmitted (e.g., some quantity of slots in the future).

Additionally, or alternatively, the SCI may include an RRI (resource reservation interval) field that may be used to reserve periodic resources. For example, the RRI field may indicate periodic resources to be used at a UE to transmit periodic sidelink messages (e.g., to transmit a transport block in each periodic resource). That is, a set of periodic resources for multiple transport blocks may be reserved using the RRI field. In some examples, a periodicity indicated using the RRI field may be configured at the UE. For example, the periodicity may be one of multiple periodicities configured at the UE (e.g., an enabled periodicity indicated using a parameter, such as an sl-ResourceReservePeriodList IE). In some examples, a reservation of periodic resources may occur (e.g., be enabled, be allowed) if one or more parameters are enabled at the UE. For example, reservation of periodic resources may be enabled using an sl-multiTBReserve IE. In some examples, enabling reservation of periodic resources using the sl-ResourceReservePeriodList IE may be based on whether another parameter indicates an enabled status, such as whether an sl-multiTBReserve IE is enabled.

In some examples, the UEs 215 may be configured to use multiple types of slots (e.g., multiple types of slot formats) for sidelink transmission. For example, both slot (e.g., full slot) and mini-slot transmissions may be enabled for sidelink communications at the UEs 215. As described herein, a mini-slot, which may also be referred to as a sub-slot, may correspond to a portion of a slot. For example, a slot may be partitioned into multiple mini-slots. That is, the UEs 215 may use a slot or one or more mini-slots (e.g., one or more portions of a slot) to transmit sidelink communications. In some examples, a mini-slot may include a quantity (e.g., one or more) symbol periods. In such examples, the quantity of symbol periods may be configured at the UE 215-a. For example, the UE 215-a may receive control signaling from a network entity indicating the quantity of symbol periods included in a mini-slot, such as a mini-slot 260-a and a mini-slot 260-b. In such an example, the UE 215-a may use a slot 255-a to transmit the sidelink message 225. Additionally, or alternatively, the UE 215-a may use one or both of the mini-slot 260-a and the mini-slot 260-b (e.g., included in a slot 255-b) to transmit the sidelink message 225. In such an example, a duration of the mini-slot 260 may be reduced relative to the slots 255. Additionally, or alternatively, the mini-slot 260-a and the mini-slot 260-b may include data (e.g., be used to transmit data), such as via a physical sidelink shared channel (PSSCH). Additionally or alternatively, the mini-slot 260-a and the mini-slot 260-b may include control information (e.g., be used to transmit control information), such as via a physical sidelink control channel (PSCCH). As illustrated in the example of FIG. 2, the mini-slot 260-a and the mini-slot 260-b (e.g., each mini-slot) may include respective PSCCH symbols 235. For example, the mini-slot 260-a may include PSCCH symbols 235 with an index of 1 and 2, while the mini-slot 260-b may include PSCCH symbols 235 with an index of 7 and 8. Additionally or alternatively, the mini-slot 260-a and the mini-slot 260-b (e.g., each mini-slot) may include one or more PSSCH symbols 245.

In some examples, a transmitting UE may transmit using one or multiple (e.g., both) mini-slots. For example, the transmitting UE (e.g., the UE 215-a) may use multiple mini-slots to transmit to multiple receiving UEs (e.g., each mini-slot may be used to transmit a sidelink message to a different receiving UE). For example, the UE 215-a may transmit a first sidelink message to a first receiving UE (e.g., the UE 215-b) using a first mini-slot (e.g., the mini-slot 260-a) and a second sidelink message to a second receiving UE (e.g., the UE 215-c) using a second mini-slot (e.g., the mini-slot 260-b). In such an example, the UE 215-a may use multiple beams to transmit the first sidelink message and the second sidelink message. For example, the UE 215-a may use a first beam to transmit the first sidelink message to the UE 215-b (e.g., using the mini-slot 260-a) and a second beam to transmit the second sidelink message to the UE 215-c (e.g., using the second mini-slot). In some examples, the UE 215-a may use a gap symbol 250 to switch between the first beam (e.g., a beam used to transmit sidelink message to the UE 215-b) and the second beam (e.g., a beam used to transmit sidelink message to the UE 215-c). For example, the gap symbol 250 may occur between consecutive mini-slot transmissions for beam switching (e.g., at the transmitting UE, the UE 215-a). As illustrated in the example of FIG. 2, the gap symbol 250 with an index of 5 may occur between the mini-slot 260-a and the mini-slot 260-b. Additionally, or alternatively, the gap symbol 250 may occur at an end of a sidelink slot (e.g., a gap symbol may be a last symbol allocated for sidelink). For example, the slots 255 may include respective gap symbols 250 with an index of 13. In some examples, a transmitting UE performing a full-slot sidelink transmission may use one or more gap symbols 250 (e.g., in-between gap symbols, such as the gap symbol 250 with an index of 5) to transmit PSSCH. In such examples, the transmitting UE may refrain from using the gap symbol 250 that occurs at an end of the sidelink slot (e.g., the gap symbol 250 with an index of 13) to transmit PSSCH.

In some examples, slots and mini-slots may be used within a same resource pool. In such examples, the slots 255 may include automatic gain control (AGC) symbols. For example, within the slots 255, one or more AGC symbols 230 may be allocated. In some examples, the AGC symbols 230 (e.g., each AGC symbol 230) may correspond to a beginning of a slot or a mini-slot. For example, within a sidelink slot (e.g., the slot 255-a), a transmitting UE (e.g., the UE 215-a) may perform a full-slot sidelink transmission (e.g., starting from a first symbol allocated for sidelink and ending in a last symbol allocated for sidelink). In such examples, a UE receiving the full-slot sidelink transmission (e.g., the UE 215-*b*) may adjust (e.g., readjust) an AGC at the UE 215-*b* using an AGC symbol (e.g., in each AGC symbol). Additionally, or alternatively, the transmitting UE (e.g., the UE 215-*a*) may perform one or more mini-slot sidelink transmissions. In such examples, the UE receiving the mini-slot sidelink transmission (e.g., the UE 215-*b*) may adjusts AGC at the UE 215-*b* for the mini-slot using the AGC symbol at a beginning of the mini-slot. For example, the UE 215-*b* may use an AGC symbol 230 with an index of 0 to adjust the AGC at the UE 215-*b* for a mini-slot 260-*a*. Additionally, or alternatively, the UE 215-*b* may use an AGC symbol 230 with an index of 6 to adjust the AGC at the UE 215-*b* for a mini-slot 260-*b*.

In some examples, a first symbol (e.g., a first OFDM symbol) of a PSSCH and an associated PSCCH may be duplicated. Additionally, or alternatively, a first symbol (e.g., a first OFDM symbol) of a PSFCH may be duplicated. In such examples, the first symbol of the PSSCH may be a duplicate of the second symbol (e.g., a second OFDM symbol) and may serve as the AGC symbol. For example, the AGC symbol 230 with an index of 0 may correspond to a beginning of the mini-slot 260-*a* and the AGC symbol 230 with an index of 6 may correspond to a beginning of the mini-slot 260-*b*. In such an example, the AGC symbol 230 with the index of 0 may be a duplicate of the PSSCH symbol 245 with an index of 1. Additionally, or alternatively, the AGC symbol 230 with the index of 6 may be a duplicate of the PSSCH symbol 245 with an index of 7. In some examples, using the first symbol of the PSSCH as the AGC symbol may enable the UE 215-*b* (e.g., the receiving UE) to adjust an AGC setting prior to receiving and decoding the PSSCH, which may begin at the second symbol of the PSSCH (e.g., the second OFDM symbol). For example, the UE 215-*b* may use the AGC symbol 230 with the index of 0 to adjust the AGC setting at the UE 215-*b* prior to receiving and decoding the PSSCH symbol 245 with an index of 1. In some examples, one or more other symbols (e.g., one or more symbols different from the first OFDM symbol) may be used at the UE 215-*b* to adjust the AGC. For example, adjusting the AGC during a first portion (e.g., half) of a slot may impact a phase continuity associated with a second portion of the slot. In such examples, the UE may use a DMRS symbol 240 to estimate (e.g., re-estimate) a channel.

As illustrated in the example of FIG. 2, the UE 215-*a* (e.g., a sidelink transmit UE) may use one or more fields included in an SCI 220-*a* (e.g., a TRA field, an FRA field, an RRI field) to reserve resources, such as mini-slot resources. That is, the UE 215-*a* may transmit the SCI 220-*a*, which may indicate a resource reservation for one or more mini-slots. In some examples, the UE 215-*a* may intend to use one or more of the reserved mini-slots to transmit the sidelink message 225. In such examples, the SCI 220-*b* may include one or more other fields (e.g., additional fields) that may be used to specify which mini-slot (e.g., among multiple mini-slots included in a slot) may be reserved.

In some examples, full-slot transmissions and mini-slot transmissions may occur in a same resource pool. For example, the UEs 215 may use a same resources pool for sidelink transmissions using slots and sidelink transmissions using mini-slots. In such examples, the UE 215-*a* may intend to transmit using a slot and, as such, may select a slot resource (e.g., a slot transmit resource, the slot 255-*a*) that is non-overlapping with reserved resources (e.g., reserved mini-slot resources or reserved slot resources), such as resource reserved at the UE 215-*c*. Additionally, or alternatively, the UE 215-*a* may intend to transmit using a mini-slot and, as such, may select a mini-slot (e.g., a mini-slot transmit resource, the mini-slot 260-*a* or the mini-slot 260-*b*) that is non-overlapping with reserved mini-slot or full-slot resources. In some examples, however, if a first one of the mini-slot 260-*a* and the mini-slot 260-*b* is reserved for a transmission at another UE (e.g., the UE 215-*c*), the UE 215-*a* may be incapable of using a second one of the mini-slot 260-*a* and the mini-slot 260-*b* irrespective of whether the second one of the mini-slot 260-*a* and the mini-slot 260-*b* is reserved. For example, if the UE 215-*c* reserves the mini-slot 260-*a* (e.g., a mini-slot that occurs earlier in time within the slot 255-*b*), the mini-slot 260-*b* (e.g., a mini-slot that occurs later in time within the slot 255-*b*) may be available for use at another UE. However, in accordance with some channel sensing procedures, the UE 215-*a* may be configured to determine whether resources are available in increments of slots. As such, if the mini-slot 260-*a* is reserved, the UE 215-*a* may determine that the mini-slot 260-*a* and the mini-slot 260-*b* (e.g., the full slot, the slot 255-*b*) may be unavailable for use at the UE 215-*a*. That is, for some channel sensing procedures, the UE 215-*a* may be configured to exclude a slot (e.g., an entire sidelink slot, the slot 255-*b*) irrespective of whether a received SCI (e.g., the SCI 220-*b*) reserved a mini-slot (e.g., a single mini-slot, one of the mini-slot 260-*a* and the mini-slot 260-*b*) within the slot 255-*b* and irrespective of whether the UE 215-*a* intends to transmit using a mini-slot.

Techniques for sidelink channel sensing with mini-slots, as described herein, may support mini-slots and sidelink channel sensing. For example, such techniques may include one or more modifications to other channel sensing procedures, such that the channel sensing procedures may accommodate mini slots in sidelink. In some examples, some techniques for sidelink channel sensing with mini-slots, as described herein, may enable the UE 215-*a* to use one of the mini-slot 260-*a* and the mini-slot 260-*b* included in the slot 255-*b* irrespective of whether another of the mini-slot 260-*a* and the mini-slot 260-*b* is reserved at another UE. For example, a UE may be configured with a procedure for determining resources (e.g., a set of resources, a subset of resources) to be reported to one or more higher layers (e.g., at the UE) for resource selection (e.g., PSSCH resource selection) in a sidelink resource allocation Mode-2 (e.g., for Mode-2 sidelink operations). In some examples of resource allocation Mode-2, a higher layer (e.g., a MAC layer) may request the UE to determine a subset of resources from which the higher layer may select resources for a sidelink transmission (e.g., a PSSCH transmission or a PSCCH transmission). In some examples, to trigger the UE to determine the subset of resources (e.g., to trigger a channel sensing procedure, such as in a quantity (n) of slots), the higher layer may provide one or more parameters (e.g., to a lower layer at the UE, the PHY layer) for the sidelink transmission. In some examples, a parameter of the one or more parameters may indicate (e.g., correspond to) a resource pool from which the UE may determine the subset of resources (e.g., the resource to be reported to the higher layers). Additionally, or alternatively, another parameter may indicate a priority associated with the sidelink transmission (e.g., a layer 1 (L1) priority, such as may be indicated using a parameter $prio_{TX}$). In some examples, a parameter of the one or more parameters may indicate a packet delay budget (e.g., a remaining packet delay budget) to be used for the sidelink transmission and another parameter may indicate a quantity of frequency resources (e.g., sub-channels, such as may be indicated using a parameter $L_{subCH}$) to be used for the sidelink transmission (e.g., in a slot or mini-slot). Additionally, or alternatively, a parameter of the one or more parameters may indicate an RRI (e.g., such as a parameter $p_{rsvp\_TX}$). In some examples, the RRI may be indicated in units of ms (or some other suitable unit).

In some examples, the UE 215-*a* may determine whether to perform a channel sensing procedure 205 for a sidelink transmission using a slot (e.g., slot based channel sensing) or for a sidelink transmission using a mini-slot (e.g., mini-slot based channel sensing) based on an indication provided by one or more higher layers at the UE 215-*a*. For example, the higher layer (e.g., the MAC layer) at the UE 215-*a* may determine a quantity of resources to be used at the UE 215-*a* for a sidelink transmission (e.g., transmission of the sidelink message 225). The higher layer may indicate the quantity or resources (e.g., and one or more other parameters) to the lower layer (e.g., the PHY layer). Additionally, or alternatively, the higher layer may indicate (e.g., in addition to the quantity of resources and the one or more other parameters) whether the UE 215-*a* may determine resources for a sidelink transmission using a slot or a mini-slot (e.g., for a full-slot transmission or a mini-slot transmission). In such examples, if the higher layer indicates for the UE 215-*a* to determine resources for the sidelink transmission using a mini-slot, the higher layer may specify a mini-slot (e.g., which of a first mini-slot or a second mini-slot) is to be used for the sidelink transmission. That is, the higher layer may indicate for the UE 215-*a* to determine resources for a mini-slot transmission that include first mini-slots (e.g., mini-slots that occur earlier in time within the respective slot, such as the mini-slot 260-*a*) or second mini-slots (e.g., mini-slots that occur later in time within the respective slot, such as the mini-slot 260-*b*).

In some examples, the higher layers may request the UE 215-*a* to determine a subset of resources from which the higher layers may select the resources for the sidelink transmission as part of a re-evaluation or pre-emption procedure. In such examples, the higher layers may provide a first set of resources ($r_0$, $r_1$, $r_2$, . . . ), which may be subject to re-evaluation and a second set of resources ($r_0$, $r_1$, $r_2$, . . . ), which may be subject to pre-emption. Additionally, or alternatively, in such examples, the UE 215-*a* may determine the subset of resources (e.g., based on UE implementation) as requested by the higher layers prior to or subsequent to a slot $$(r_i'' - T_3)$$

in which $$r_i''$$

may correspond to a smallest slot index among the first set of resources ($r_0$, $r_1$, $r_2$, . . . ) and the second set of resources $$(r_0', r_1', r_2', \dots),$$

and $T_3$ may correspond to a quantity of slots that may be determined according to a parameter $$T_{proc,1}^{SL}.$$

In some examples, $$T_{proc,1}^{SL}.$$

may depend on another parameter $\mu_{SL}$, which may correspond to a subcarrier spacing configuration associated with a sidelink BWP (e.g., to be used for the sidelink transmission). In some examples, the higher layers may provide an indication of a resource selection mechanism (or multiple resources selection mechanisms) using an allowedResourceSelectionConfig IE, which may include full sensing, partial sensing, random resource selection, or any combination thereof.

In some examples, the UE 215-*a* may be configured with one or more rules for performing the channel sensing procedure 205. For example, the UE 215-*a* may be configured to exclude a candidate resource (e.g., single slot resource or single mini-slot resource) from a set of resource if the candidate resource satisfies one or more conditions. In some examples, the UE 215-*a* may exclude a candidate resource if the UE 215-*a* receives an SCI (e.g., an SCI format 1-A) in a slot or mini-slot and a first field (e.g., a 'Resource reservation period' field) and a second field (e.g., a 'Priority' field) included in the SCI indicate some values for $P_{rsvp\_RX}$ and $prio_{RX}$, respectively. Additionally, or alternatively, the UE 215-*a* may exclude a candidate resource if an RSRP measurement performed at the UE 215-*a* of the received SCI satisfies (e.g., is higher than) a threshold (e.g., $TH(p_i, P_j)$).

In some examples, the one or more rules may indicate steps to be performed at the UE 215-*a* as part of the channel sensing procedure 205. For example, the rules may indicate for a candidate resource (e.g., a candidate single slot resource, a candidate single mini-slot resource) for a transmission may include a set (e.g., $L_{subCH}$) of contiguous sub-channels including sub-channel (x+j) in a slot or a mini-slot, in which j=0, . . . , $L_{subCH}$−1. The UE 215-*a* may assume that a set of $L_{subCH}$ contiguous sub-channels included in the corresponding resource pool within a time interval [n+$T_1$, n+$T_2$] corresponding to a candidate resource if the UE 215-*a* is performing full sensing, in a set of Y candidate slots or mini-slots within the time interval [n+$T_1$, n+$T_2$] for the UE performing periodic-based partial sensing corresponding to a candidate resource, or in a set of Y' candidate slots or mini-slots within the time interval [n+$T_1$, n+$T_2$] if the UE 215-*a* is performing contiguous partial sensing, for example if $P_{rsvp\_RX}$=0.

As illustrated in the example of FIG. 2, the UE 215-*a* may perform the channel sensing procedure 205 (e.g., a slot-related channel sensing procedure) in response to receiving an indication of the slot-related channel sensing procedure from the higher layer at the UE 215-*a*. For example, the UE 215-*a* may receive, at the lower layer from the higher layer, an indication of the slot-related channel sensing procedure to be performed at the UE 215-*a* during channel sensing. The slot-related sensing procedure may be one of multiple available slot-related channel sensing procedures at the UE 215-*a*. Additionally, or alternatively, the slot-related channel sensing procedure may indicate time interval increments in which the UE 215-*a* may perform channel sensing. For example, the slot-related channel sensing procedure may indicate time interval increments that may include a slot length or a mini-slot length. In such an example, the UE 215-a may use the indicated time interval increments to sense for slots or mini-slots that may be available, based on whether the higher layer (e.g., the MAC layer) instructs the UE 215-a to performing channel sensing using the slot length or the mini-slot length.

For example, the slot-related channel sensing procedure may indicate, to the UE 215-a, to perform one of slot-based channel sensing or sub-slot-based channel sensing. In some examples, the slot-related channel sensing procedure may be indicated using one or more parameters (e.g., associated with the sidelink message 225) transmitted from the higher layer at the UE 215-a. For example, the higher layer at the UE 215-a use one or more parameters to indicate whether the channel sensing procedure 205 is to be performed to determine resources for a sidelink transmission (e.g., transmission of the sidelink message 225) using a slot or a mini-slot.

The UE 215-a may perform the slot-related channel sensing procedure (e.g., the channel sensing procedure 205) in the time interval increments of a sidelink resource pool to identify a first time-frequency resource of the sidelink resource pool that is available for transmission of the sidelink message 225. The UE 215-a may transmit the sidelink message 225 via the first time-frequency resource. In some examples, using the channel sensing procedure 205 (e.g., a slot-related channel sensing procedure) may enable increased resource utilization within the wireless communications system 200, among other possible benefits.

Figure 3:
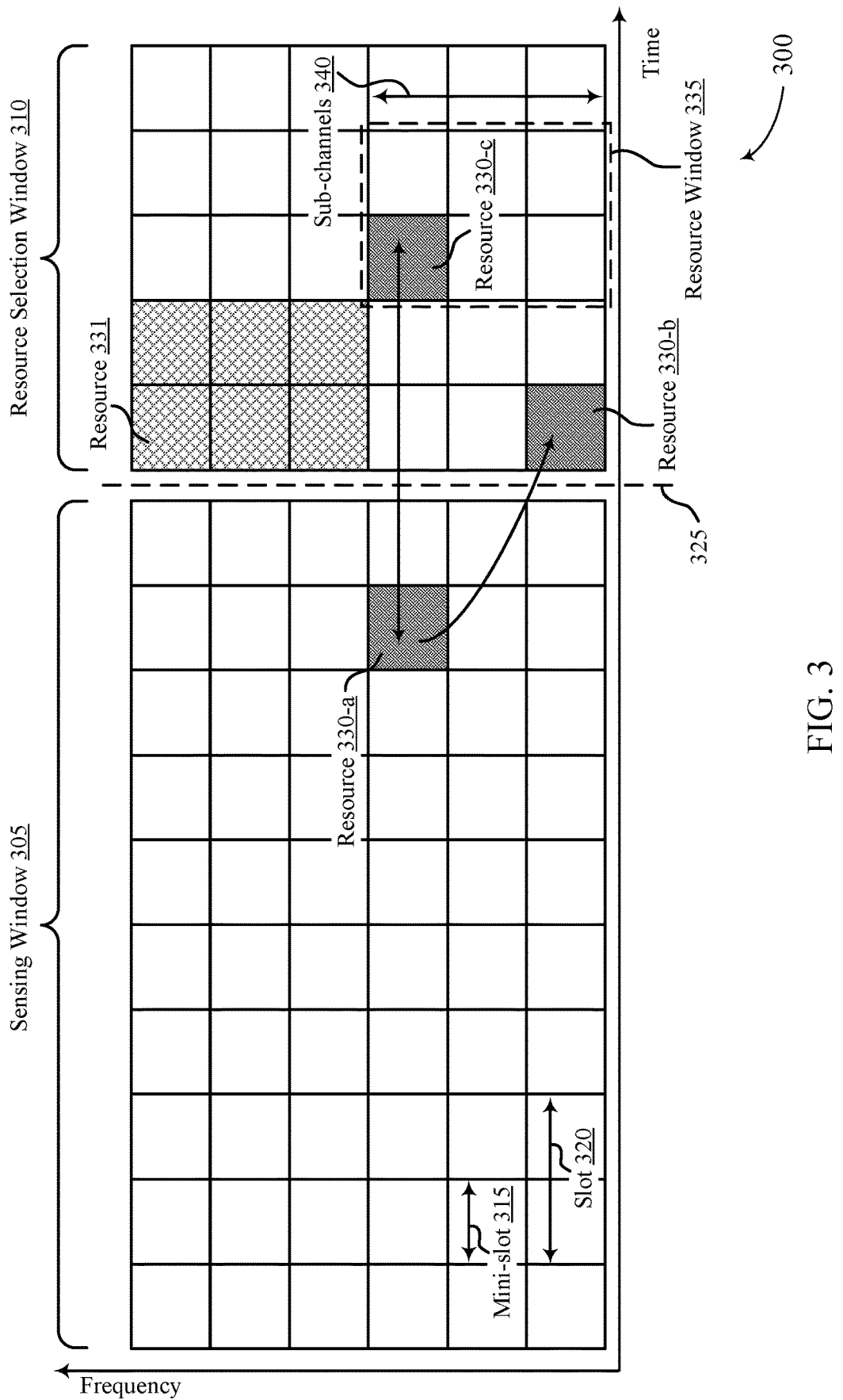
FIGS. 3, 4 and 5 each illustrate an example of a timing diagram that supports techniques for sidelink channel sensing with mini-slots in accordance with one or more aspects of the present disclosure.

FIG. 3 illustrates an example of a timing diagram 300 that supports techniques for sidelink channel sensing with mini-slots in accordance with one or more aspects of the present disclosure. In some examples, the timing diagram 300 may implement or be implemented at one or more aspects of the wireless communications system 100 and the wireless communications system 200. For example, the timing diagram 300 may illustrate operations performed at one or more UEs, which may be examples of a UE described with reference to FIGS. 1 and 2.

In some examples, one or more UEs may support a channel sensing procedure for a resource pool that may be used for slots and mini-slots. For example, a first UE may determine to transmit a sidelink message using one or more resources that may occur subsequent to a slot (n), during which the first UE may initiate a resource selection trigger. For example, the first UE may determine to transmit a sidelink message using one or more resource included in a resource selection window 310, which may occur subsequent to a time instance 325 during which the first UE may initiate the resource selection trigger. In some examples, the first UE may initiate the resource selection trigger (e.g., at the time instance 325) based on one or more indications from a higher layer at the first UE. For example, the higher layer at the first UE may request for the first UE to determine (e.g., and report to the higher layer) a set of resources available for a sidelink transmission using a slot 320. Additionally, or alternatively, the higher layer may indicate one or more parameters associated with the sidelink transmission. In some examples, the first UE may initiate the selection trigger (e.g., at the time instance 325) in response to receiving the indication of the one or more parameters. That is, in response to receiving one or more parameters associated with a sidelink transmission using a slot, the first UE may determine to perform slot based channel sensing (e.g., for a full-slot transmission).

In some examples, in response to initiating the resource selection trigger, the first UE may attempt to decode control information (e.g., SCI) received at the first UE prior to initiating the resource selection trigger. That is, the UE may identify (e.g., look for) resources for transmitting a sidelink message using a full slot. For example, the first UE may monitor resources included in a sensing window 305. In such an example, the first UE may receive SCI from a second UE using a resource 330-a, which may include (e.g., span in a time domain) a mini-slot 315. In some examples, the first UE may receive the SCI (e.g., using the resource 330-a) with a receive power that may satisfy a threshold. That is, the first UE may receive the SCI (e.g., an SCI 1-A) using a mini-slot and the SCI (or a corresponding PSSCH) may be received at the first UE with a received power (e.g., an RSRP) that satisfies a threshold (e.g., RSRP≥TH($p_i$, $P_j$)). In some examples, the first UE may determine whether to use a PSCCH or a PSSCH (e.g., a PSCCH symbol or a PSSCH symbol) to measure the RSRP based on a parameter (e.g., a sl-RS-ForSensing IE). The SCI may indicate that a resource 330-b and a resource 330-c are reserved at the second UE for a sidelink transmission. For example, the SCI received in the mini-slot (e.g., using the resource 330-a) of a slot (e.g., slot m) may include an $RRI_i$, and priority (p_i). In such an example (e.g., for $RRI_i$≠0), the RRI may indicate a periodic time-frequency resource (e.g., the resource 330-c) reserved at the second UE.

Additionally, or alternatively, the SCI received in the mini-slot (e.g., the resource 330-a) may include a TRA that may indicate another time-frequency resource (e.g., the resource 330-b) reserved at the second UE. In such an example, the first UE may determine that the resources reserved using the SCI (e.g., the resource 330-b and the resource 330-c) may be unavailable for a sidelink transmission at the first UE. Additionally, or alternatively, the first UE may determine that the reserved resources (e.g., the resource 330-b and the resource 330-c) are mini-slots (e.g., include mini-slots, span a mini-slot in the time domain). For example, the first UE may exclude full-slot (e.g., any full slot) and contiguous sub-channel resources that may overlap with resources reserved by the received SCI. That is, the first UE may exclude full-slots and a quantity of contiguous sub-channels that may overlap with a time-frequency resource indicated using the received SCI. As illustrated in the example of FIG. 3, the first UE may exclude (e.g., may refrain from attempting to reserve for the sidelink transmission) time-frequency resources that overlap with a resource window 335, which may span a slot 320 in the time domain and sub-channels 340 in a frequency domain (e.g., a set of contiguous sub-channels, which may be indicated using a parameter $L_{subCH}$). The sub-channels 340 may correspond to a quantity of sub-channels the first UE may use to transmit the sidelink message. For example, the first UE may transmit a sidelink message using a resource 331 that does not overlap with a slot (e.g., in the time domain) having a set of contiguous frequency resources (e.g., sub-channels 340) that includes the resource 330-b or the resource 330-c reserved by the SCI.

In some examples, the first UE may transmit a sidelink message using the resource 331 based on the resource 331 being non-overlapping with the resource window 335. For example, the first UE may identify a quantity of resources within the resource selection window 310 that may be unavailable for transmission of the sidelink message. In some examples, the identified quantity of resources may include resources reserved at other UEs (e.g., the resource 330-b an the resource 330-c) and resources adjacent to the reserved resources (e.g., resources included within the resource window 335). In such examples, the first UE may refrain from attempting to reserve the identified quantity of resources. For example, the first UE may attempt to reserve one of the other resources, such as a full slot resource (e.g., the resource 331) that does not overlap with the resource 330-*b* or the resource 330-*c*. For instance, the first UE may transmit a SCI message prior to the resource selection window 310 to reserve the resource 331. Additionally, or alternatively, the first UE may use the resource 331 to transmit the sidelink message. In some examples, using the resource 331 to transmit the sidelink message may improve a reliability of communications at the first UE, among other possible benefits.

Figure 4:
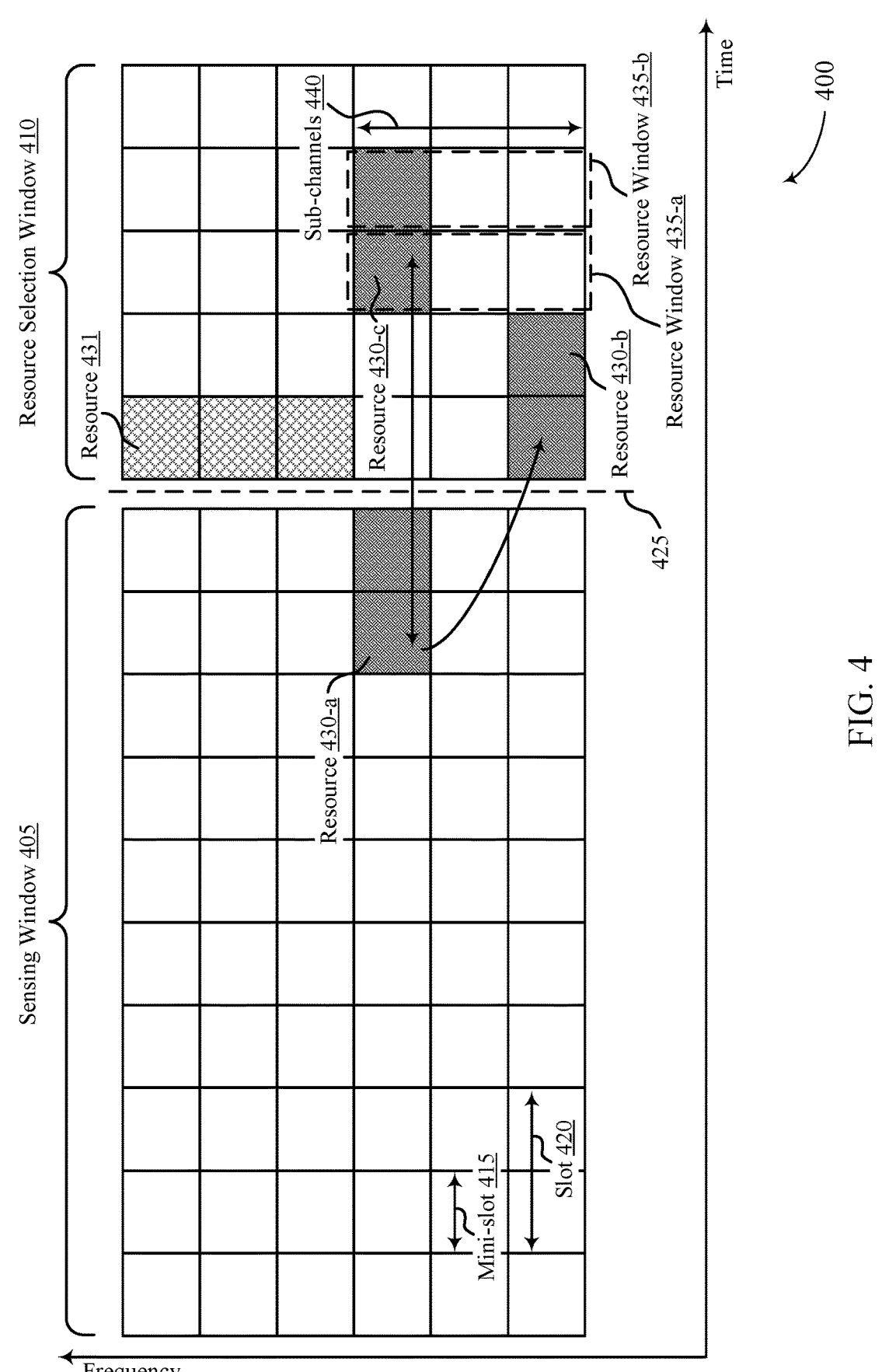

FIG. 4 illustrates an example of a timing diagram 400 that supports techniques for sidelink channel sensing with mini-slots in accordance with one or more aspects of the present disclosure. In some examples, the timing diagram 400 may implement or be implemented at one or more aspects of the wireless communications system 100, the wireless communications system 200, and the timing diagram 300. For example, the timing diagram 400 may illustrate operations performed at one or more UEs, which may be examples of a UE described with reference to FIGS. 1 through 3.

In some examples, one or more UEs may support a channel sensing procedure for a resource pool that may be used for slots and mini-slots. For example, a first UE may determine to transmit a sidelink message using one or more resource included in a resource selection window 410. The resource selection window 410 may occur subsequent to a time instance 425 during which the first UE may initiate the resource selection trigger. In some examples, the first UE may initiate the resource selection trigger based on one or more indications from a higher layer at the first UE. For example, the higher layer at the first UE may request for a lower layer at the first UE to determine (e.g., and report to the higher layer) a set of resources available for a sidelink transmission using a mini-slot 415. Additionally, or alternatively, the higher layer may indicate one or more parameters associated with the sidelink transmission. In some examples, the first UE may initiate the selection trigger (e.g., at the time instance 425) in response to receiving the indication of the one or more parameters. That is, in response to receiving the indication of the one or more parameters associated with a sidelink transmission using a mini-slot, the first UE may determine to perform mini-slot based channel sensing (e.g., channel sensing for a mini-slot transmission).

In some examples, to identify resources for transmitting a sidelink message using a mini-slot (e.g., to look for resources for transmitting a mini-slot), the first UE may monitor for SCI during a sensing window 405. In such examples, the first UE may receive SCI from a second UE using a resource 430-*a*, which may span a slot 420 in the time domain. The SCI may indicate that a resource 430-*b* and a resource 430-*c* are reserved at the second UE for a sidelink transmission. In some examples, the first UE may receive the SCI (e.g., using the resource 430-*a*) with a receive power that may satisfy a threshold. In such an example, the first UE may determine that the resources reserved using the SCI (e.g., the resource 430-*b* and the resource 430-*c*) may be unavailable for a sidelink transmission at the first UE. For example, the first UE may exclude resources (e.g., any contiguous sub-channel mini-slot resources) that may overlap with resources reserved by the received SCI. That is, the first UE may exclude mini-slots and a quantity of contiguous sub-channels that may overlap with a time-frequency resource indicated using the received SCI. As illustrated in the example of FIG. 4, the first UE may exclude (e.g., refrain from attempting to reserve for the sidelink transmission) time-frequency resources that overlap with a resource window 435-*a* and a resource window 435-*b*, which may span a mini-slot 415 in a time domain and sub-channels 440 in a frequency domain (e.g., a set of contiguous sub-channels, which may be indicated using a parameter $L_{subCH}$). The sub-channels 440 may correspond to a quantity of sub-channels the first UE may use to transmit the sidelink message. For example, the first UE may transmit a sidelink message using a resource 431 that does not overlap with a mini-slot (e.g., in the time domain) having a set of contiguous frequency resources (e.g., sub-channels 440) that includes the resource 430-*b* or the resource 430-*c* reserved by the SCI. In some examples, the first UE may transmit a sidelink message using the resource 431 based on the resource 431 being non-overlapping with the resource 430-*c* and the resource 430-*b*.

In some examples, the first UE may transmit a sidelink message using the resource 431 based on the resource 431 being non-overlapping with the resource 430-*c* and the resource 430-*b*. For example, the first UE may identify a quantity of resources within the resource selection window 410 that may be unavailable for transmission of the sidelink message. In some examples, the identified quantity of resources may include resources reserved at other UEs (e.g., the resource 430-*b* an the resource 430-*c*) and resources adjacent to the reserved resources (e.g., resources included within the resource windows 435). In such examples, the first UE may refrain from attempting to reserve the identified quantity of resources. For example, the first UE may attempt to reserve one of the other resources, such as a mini-slot slot resource (e.g., the resource 431) that does not overlap with the resource 430-*b* or the resource 430-*c*. For instance, the first UE may transmit a SCI message prior to the resource selection window 410 to reserve the resource 431. Additionally, or alternatively, the first UE may use the resource 431 to transmit the sidelink message. In some examples, using the resource 431 to transmit the sidelink message may improve a reliability of communications at the UE, among other possible benefits.

Figure 5:
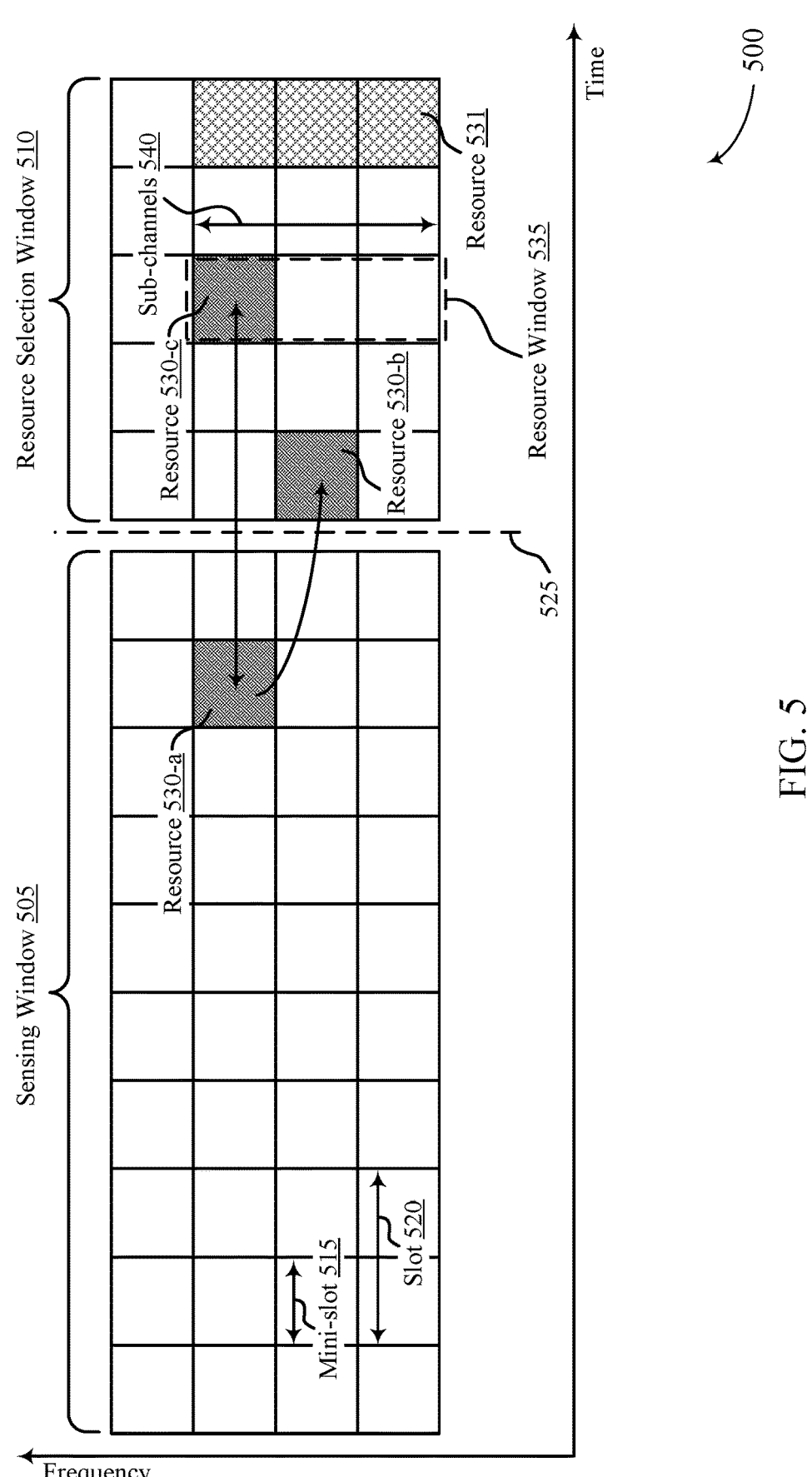

FIG. 5 illustrates an example of a timing diagram 500 that supports techniques for sidelink channel sensing with mini-slots in accordance with one or more aspects of the present disclosure. In some examples, the timing diagram 500 may implement or be implemented at one or more aspects of the wireless communications system 100, the wireless communications system 200, the timing diagram 300, and the timing diagram 400. For example, the timing diagram 500 may illustrate operations performed at one or more UEs, which may be examples of a UE described with reference to FIGS. 1 through 4.

In some examples, one or more UEs may support a channel sensing procedure for a resource pool that may be used for slots and mini-slots. For example, a first UE may determine to transmit a sidelink message using one or more resource included in a resource selection window 510. The resource selection window 510 may occur subsequent to a time instance 525 during which the first UE may initiate the resource selection trigger. In some examples, the first UE may initiate the resource selection trigger based on one or more indications from a higher layer at the first UE. For example, the higher layer at the first UE may request for a lower layer at the first UE to determine (e.g., and report to the higher layer) a set of resources available for a sidelink transmission using a mini-slot 515 (e.g., included in a slot 520). Additionally, or alternatively, the higher layer may indicate one or more parameters associated with the sidelink transmission. In some examples, the first UE may initiate the selection trigger (e.g., at the time instance 525) in response to receiving the indication of the one or more parameters. That is, in response to receiving the indication of the one or more parameters associated with a sidelink transmission using a mini-slot, the first UE may determine to perform mini-slot based channel sensing (e.g., channel sensing for a mini-slot transmission).

In some examples, to identify resources for transmitting a sidelink message using a mini-slot (e.g., to look for resources for transmitting a mini-slot), the first UE may monitor for SCI during a sensing window 505. In such examples, the first UE may receive SCI from a second UE using a resource 530-a, which may span a mini-slot 515 in the time domain. The SCI may indicate that a resource 530-b and a resource 530-c are reserved at the second UE for a sidelink transmission. In some examples, the first UE may receive the SCI (e.g., using the resource 530-a) with a receive power that may satisfy a threshold. In such an example, the first UE may determine that the resources reserved using the SCI (e.g., the resource 530-b and the resource 530-c) may be unavailable for a sidelink transmission at the first UE. For example, the first UE may exclude resources (e.g., any contiguous sub-channel mini-slot resources) that may overlap with resources reserved by the received SCI. That is, the first UE may exclude mini-slots and a quantity of contiguous sub-channels that may overlap with a time-frequency resource indicated using the received SCI. As illustrated in the example of FIG. 5, the first UE may exclude (e.g., refrain from attempting to reserve for the sidelink transmission) time-frequency resources that overlap with a resource window 535, which may span a mini-slot 515 in a time domain and sub-channels 540 in a frequency domain (e.g., a set of contiguous sub-channels, which may be indicated using a parameter $L_{subCH}$). The sub-channels 540 may correspond to a quantity of sub-channels the first UE may use to transmit the sidelink message. For example, the first UE may transmit a sidelink message using a resource 531 that does not overlap with a mini-slot (e.g., in the time domain) having a set of contiguous frequency resources (e.g., sub-channels 540) that includes the resource 530-b or the resource 530-c reserved by the SCI.

In some examples, the first UE may transmit a sidelink message using the resource 531 based on the resource 531 being non-overlapping with the resource window 535. For example, the first UE may identify a quantity of resources within the resource selection window 510 that may be unavailable for transmission of the sidelink message. In some examples, the identified quantity of resources may include resources reserved at other UEs (e.g., the resource 530-b an the resource 530-c) and resources adjacent to the reserved resources (e.g., resources included within the resource windows 535). In such examples, the first UE may refrain from attempting to reserve the identified quantity of resources. For example, the first UE may attempt to reserve one of the other resources, such as a mini-slot slot resource (e.g., the resource 531) that does not overlap with the resource 530-b or the resource 530-c. For instance, the first UE may transmit a SCI message prior to the resource selection window 510 to reserve the resource 531. Additionally, or alternatively, the first UE may use the resource 531 to transmit the sidelink message. In some examples, using the resource 531 to transmit the sidelink message may improve a reliability of communications at the UE, among other possible benefits.

Figure 6:
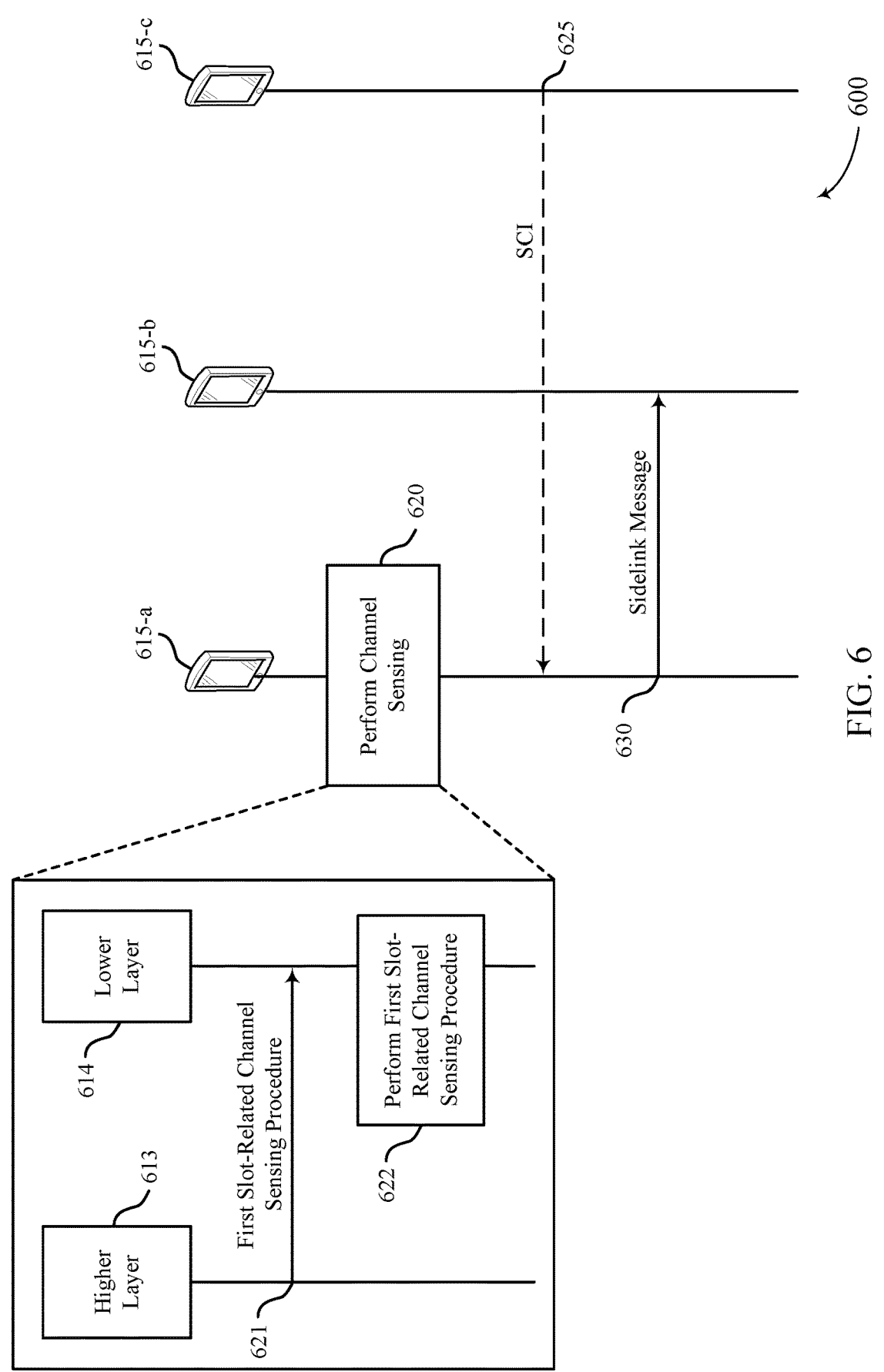
FIG. 6 illustrates an example of a process flow that supports techniques for sidelink channel sensing with mini-slots in accordance with one or more aspects of the present disclosure.

FIG. 6 illustrates an example of a process flow 600 that supports techniques for sidelink channel sensing with mini-slots in accordance with one or more aspects of the present disclosure. In some examples, the process flow 600 may implement one or more aspects of the wireless communications system 100, the wireless communications system 200, the timing diagram 300, the timing diagram 400, and the timing diagram 500. For example, the process flow 600 may include example operations associated with a UE 615-a, a UE 615-b, and a UE 615-c, which may be examples of a UE described with reference to FIGS. 1 through 5. The operations performed at the UEs 615 may support improvements to communications between the UEs 615, among other benefits. In the following description of the process flow 600, the operations between the UEs 615 may occur in a different order than the example order shown. Additionally, or alternatively, the operations performed at the UEs 615 may be performed in different orders or at different times. Some operations may also be omitted. In some examples, the UEs 615 may support a framework for channel sensing procedures that accommodate slot-based and mini-slot-based channel sensing.

At 620, the UE 215-a may perform channel sensing. For example, at 621, a lower layer 614 (e.g., of a protocol stack associated with the UE 615-a) may receive an indication of a first slot-related channel sensing procedure to perform during the channel sensing (e.g., at 620) from a higher layer 613 of the protocol stack. The first slot-related channel sensing procedure may be one of multiple available slot-related channel sensing procedures. In some examples, the first slot-related channel sensing procedure may indicate time interval increments in which to perform the channel sensing. At 622, the lower layer 614 of the protocol stack associated with the UE 615-a may perform the first slot-related channel sensing procedure based on the indication. The first slot related channel sensing procedure may be an example of slot-based or sub-slot-based channel sensing procedure as described throughout the present disclosure, including with reference to FIG. 2. For example, the first slot-related channel sensing procedure may indicate, to the UE 615-a, to perform one of slot-based channel sensing or sub-slot-based channel sensing. The UE 615-a may perform the first slot-related channel sensing procedure (e.g., at 622) in the time interval increments (e.g., a slot length or a sub-slot length) of a sidelink resource pool to identify a first time-frequency resource of the sidelink resource pool that is available for transmission of a sidelink message.

In some examples, at 625, the UE 615-a may receive SCI from the UE 615-c UE during a sensing window monitored by the first slot-related channel sensing procedure. The SCI may be an example of SCI described throughout the present disclosure including with reference to FIG. 2. For example, the SCI may reserve a sub-slot (or slot) of the sidelink resource pool.

At 630, the UE 615-a may transmit a sidelink message to the UE 615-b using the first time-frequency resource that does not overlap with the sub-slot (or slot) reserved by the SCI based on a received power of the SCI transmitted at 625 satisfying a threshold. In some examples, using the first slot related channel sensing procedure to identify the first time-frequency resource may promote increased resource utilization of a shared radio frequency spectrum band, among other possible benefits.

Figure 7:
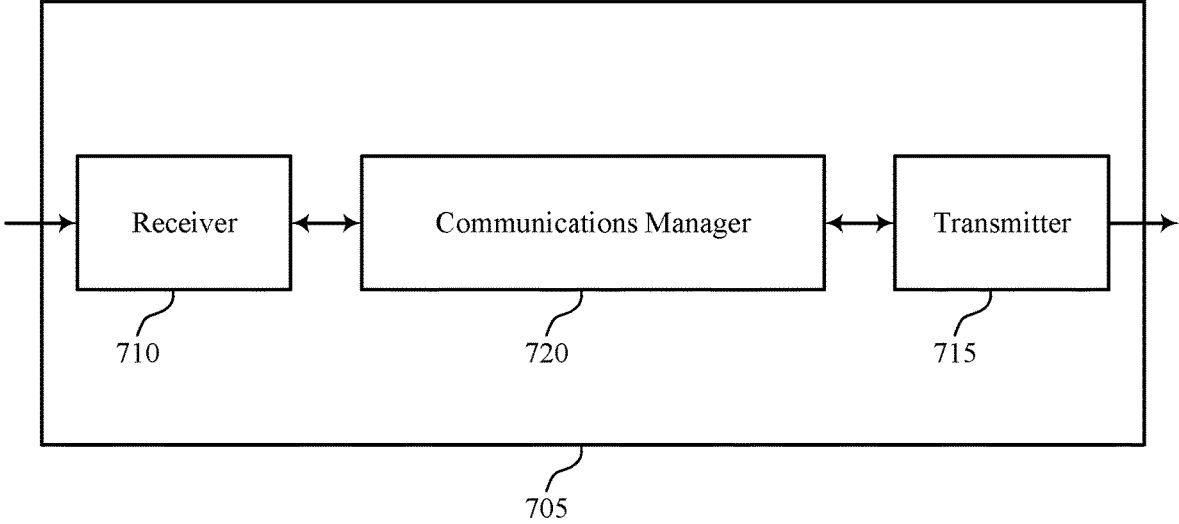
FIGS. 7 and 8 illustrate block diagrams of devices that support techniques for sidelink channel sensing with mini-slots in accordance with one or more aspects of the present disclosure.

FIG. 7 illustrates a block diagram 700 of a device 705 that supports techniques for sidelink channel sensing with mini-slots in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for sidelink channel sensing with mini-slots). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for sidelink channel sensing with mini-slots). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of techniques for sidelink channel sensing with mini-slots as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE (e.g., the device 705) in accordance with examples as disclosed herein. For example, the communications manager 720 may be configured as or otherwise support a means for receiving an indication of a first slot-related channel sensing procedure of a set of multiple available slot-related channel sensing procedures to perform during channel sensing, the first slot-related channel sensing procedure indicating time interval increments in which to perform the channel sensing. The communications manager 720 may be configured as or otherwise support a means for performing, based on the indication, the first slot-related channel sensing procedure in the time interval increments of a sidelink resource pool to identify a first time-frequency resource of the sidelink resource pool that is available for transmission of a sidelink message. The communications manager 720 may be configured as or otherwise support a means for transmitting the sidelink message via the first time-frequency resource.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for more efficient utilization of communication resources.

Figure 8:

FIG. 8 illustrates a block diagram 800 of a device 805 that supports techniques for sidelink channel sensing with mini-slots in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for sidelink channel sensing with mini-slots). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for sidelink channel sensing with mini-slots). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of techniques for sidelink channel sensing with mini-slots as described herein. For example, the communications manager 820 may include a sensing procedure indication component 825, a channel sensing component 830, a sidelink message component 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a UE (e.g., the device 805) in accordance with examples as disclosed herein. The sensing procedure indication component 825 may be configured as or otherwise support a means for receiving an indication of a first slot-related channel sensing procedure of a set of multiple available slot-related channel sensing procedures to perform during channel sensing, the first slot-related channel sensing procedure indicating time interval increments in which to perform the channel sensing. The channel sensing component 830 may be configured as or otherwise support a means for performing, based on the indication, the first slot-related channel sensing procedure in the time interval increments of a sidelink resource pool to identify a first time-frequency resource of the sidelink resource pool that is available for transmission of a sidelink message. The sidelink message component 835 may be configured as or otherwise support a means for transmitting the sidelink message via the first time-frequency resource.

FIG. 9 illustrates a block diagram 900 of a communications manager 920 that supports techniques for sidelink channel sensing with mini-slots in accordance with one or more aspects of the present disclosure. The communications manager 920 may be an example of aspects of a communications manager 720, a communications manager 820, or both, as described herein. The communications manager 920, or various components thereof, may be an example of means for performing various aspects of techniques for sidelink channel sensing with mini-slots as described herein. For example, the communications manager 920 may include a sensing procedure indication component 925, a channel sensing component 930, a sidelink message component 935, an SCI component 940, a priority component 945, or any combination thereof. Each of these components may communicate, directly or indirectly, with one another (e.g., via one or more buses).

The communications manager 920 may support wireless communications at a UE in accordance with examples as disclosed herein. The sensing procedure indication component 925 may be configured as or otherwise support a means for receiving an indication of a first slot-related channel sensing procedure of a set of multiple available slot-related channel sensing procedures to perform during channel sensing, the first slot-related channel sensing procedure indicating time interval increments in which to perform the channel sensing. The channel sensing component 930 may be configured as or otherwise support a means for performing, based on the indication, the first slot-related channel sensing procedure in the time interval increments of a sidelink resource pool to identify a first time-frequency resource of the sidelink resource pool that is available for transmission of a sidelink message. The sidelink message component 935 may be configured as or otherwise support a means for transmitting the sidelink message via the first time-frequency resource.

In some examples, to support performing the first slot-related channel sensing procedure, the SCI component 940 may be configured as or otherwise support a means for receiving, from a second UE during a sensing window monitored by the first slot-related channel sensing procedure, SCI that reserves a sub-slot of the sidelink resource pool, where the sidelink message is transmitted using the first time-frequency resource that does not overlap with the sub-slot reserved by the SCI based on a received power of the SCI satisfying a threshold. In some examples, the priority component 945 may be configured as or otherwise support a means for receiving an indication of a first priority associated with the sidelink message, where the threshold is based on the first priority associated with the sidelink message and a second priority associated with the sub-slot reserved by the SCI.

In some examples, to support performing the first slot-related channel sensing procedure, the SCI component 940 may be configured as or otherwise support a means for receiving, from a second UE during a sensing window monitored by the first slot-related channel sensing procedure, SCI that reserves a sub-slot of the sidelink resource pool, where the sidelink message is transmitted via the first time-frequency resource that does not overlap with a slot having a set of contiguous frequency resources that includes the sub-slot reserved by the SCI.

In some examples, to support performing the first slot-related channel sensing procedure, the SCI component 940 may be configured as or otherwise support a means for receiving, from a second UE during a sensing window monitored by the first slot-related channel sensing procedure, SCI that reserves a slot of the sidelink resource pool, where the sidelink message is transmitted via the first time-frequency resource that does not overlap with a sub-slot having a set of contiguous frequency resources that includes the slot reserved by the SCI.

In some examples, to support performing the first slot-related channel sensing procedure, the SCI component 940 may be configured as or otherwise support a means for receiving, from a second UE during a sensing window monitored by the first slot-related channel sensing procedure, SCI that reserves a first sub-slot of the sidelink resource pool, where the sidelink message is transmitted via the first time-frequency resource that does not overlap with a second sub-slot having a set of contiguous frequency resources that includes the first sub-slot reserved by the SCI.

In some examples, the sensing procedure indication component 925 may be configured as or otherwise support a means for receiving an indication of one or more parameters associated with the first slot-related channel sensing procedure, where the first slot-related channel sensing procedure is performed in response to receiving the indication of the one or more parameters. In some examples, the one or more parameters include one or more of the sidelink resource pool that is available for transmission of the sidelink message, a priority associated with the sidelink message, a packet delay budget associated with the sidelink message, or a quantity of contiguous frequency resources to be used for transmission of the sidelink message. In some examples, the first slot-related channel sensing procedure indicates, to the UE, to perform one of slot-based channel sensing or sub-slot-based channel sensing.

Figure 10:
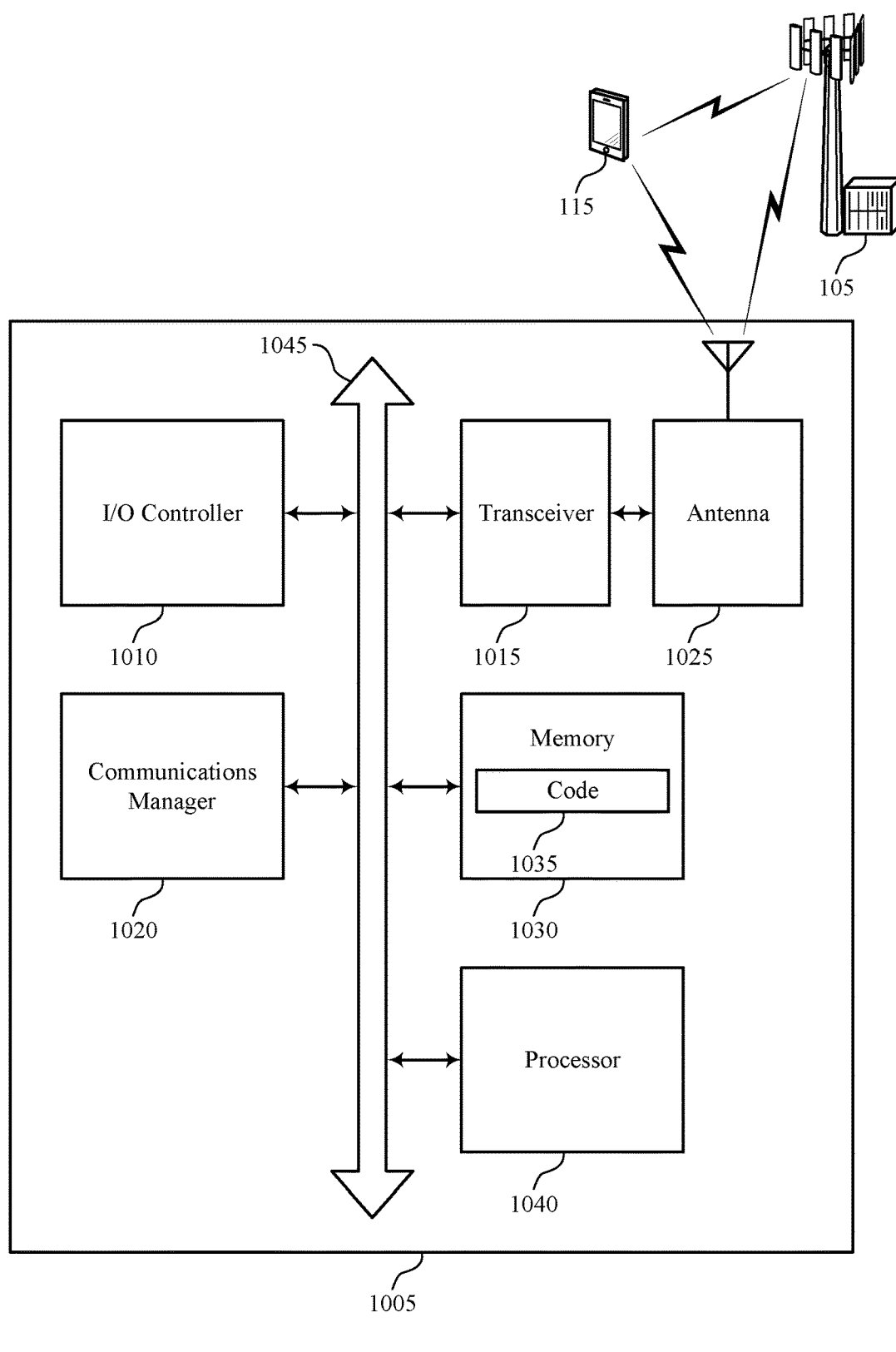
FIG. 10 illustrates a diagram of a system including a device that supports techniques for sidelink channel sensing with mini-slots in accordance with one or more aspects of the present disclosure.

FIG. 10 illustrates a diagram of a system 1000 including a device 1005 that supports techniques for sidelink channel sensing with mini-slots in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for sidelink channel sensing with mini-slots). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communications at a UE (e.g., the device 1005) in accordance with examples as disclosed herein. For example, the communications manager 1020 may be configured as or otherwise support a means for receiving an indication of a first slot-related channel sensing procedure of a set of multiple available slot-related channel sensing procedures to perform during channel sensing, the first slot-related channel sensing procedure indicating time interval increments in which to perform the channel sensing. The communications manager 1020 may be configured as or otherwise support a means for performing, based on the indication, the first slot-related channel sensing procedure in the time interval increments of a sidelink resource pool to identify a first time-frequency resource of the sidelink resource pool that is available for transmission of a sidelink message. The communications manager 1020 may be configured as or otherwise support a means for transmitting the sidelink message via the first time-frequency resource.

By including or configuring the communications manager 1020 in accordance with examples as described herein, the device 1005 may support techniques for improved communication reliability, reduced latency, and more efficient utilization of communication resources.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques for sidelink channel sensing with mini-slots as described herein, or the processor 1040 and the memory 1030 may be otherwise configured to perform or support such operations.

FIG. 11 illustrates a flowchart illustrating a method 1100 that supports techniques for sidelink channel sensing with mini-slots in accordance with one or more aspects of the present disclosure. The operations of the method 1100 may be implemented by a UE or its components as described herein. For example, the operations of the method 1100 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1105, the method may include receiving an indication of a first slot-related channel sensing procedure of a set of multiple available slot-related channel sensing procedures to perform during channel sensing, the first slot-related channel sensing procedure indicating time interval increments in which to perform the channel sensing. The operations of 1105 may be performed in accordance with examples as disclosed herein. In some examples, aspects of the operations of 1105 may be performed by a sensing procedure indication component 925 as described with reference to FIG. 9.

At 1110, the method may include performing, based on the indication, the first slot-related channel sensing procedure in the time interval increments of a sidelink resource pool to identify a first time-frequency resource of the sidelink resource pool that is available for transmission of a sidelink message. The operations of 1110 may be performed in accordance with examples as disclosed herein. In some examples, aspects of the operations of 1110 may be performed by a channel sensing component 930 as described with reference to FIG. 9.

At 1115, the method may include transmitting the sidelink message via the first time-frequency resource. The operations of 1115 may be performed in accordance with examples as disclosed herein. In some examples, aspects of the operations of 1115 may be performed by a sidelink message component 935 as described with reference to FIG. 9.

Figure 12:
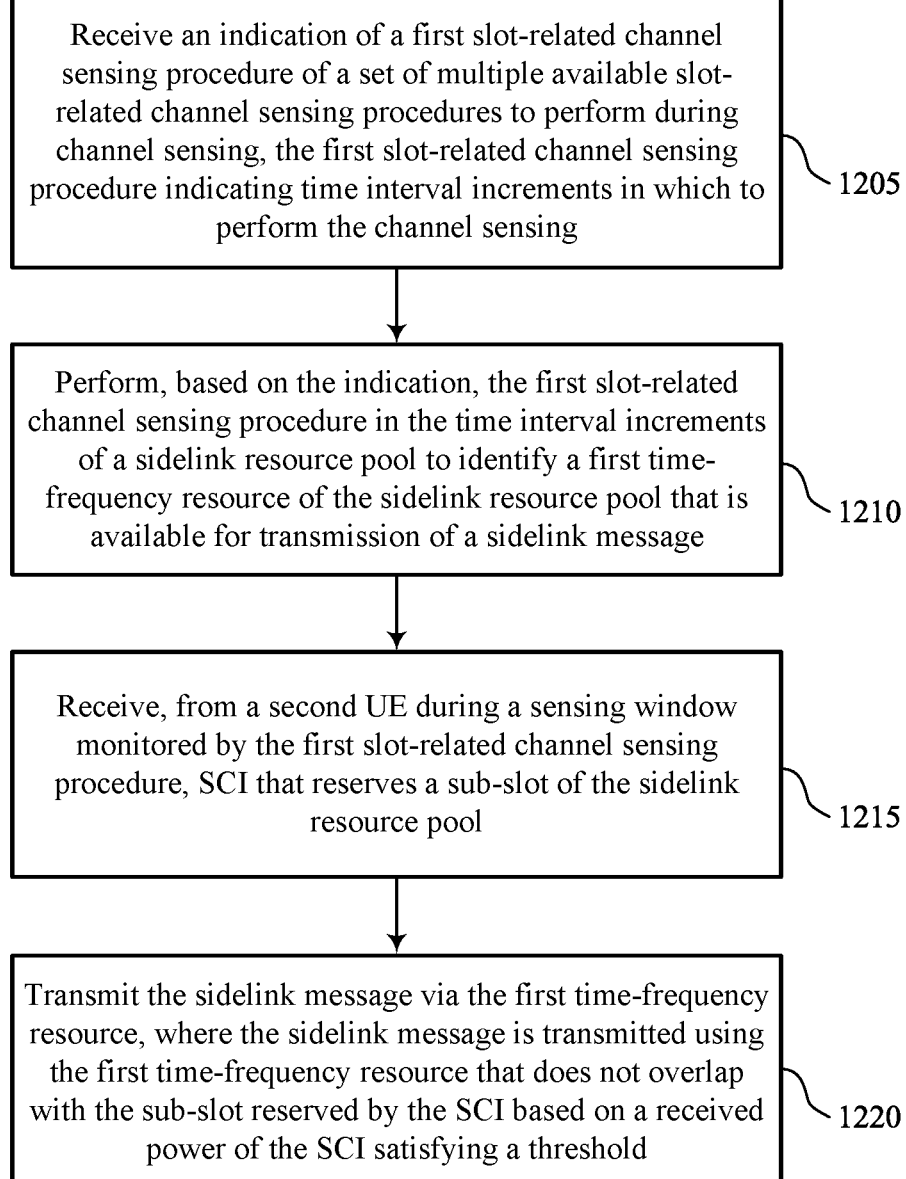

FIG. 12 illustrates a flowchart illustrating a method 1200 that supports techniques for sidelink channel sensing with mini-slots in accordance with one or more aspects of the present disclosure. The operations of the method 1200 may be implemented by a UE or its components as described herein. For example, the operations of the method 1200 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1205, the method may include receiving an indication of a first slot-related channel sensing procedure of a set of multiple available slot-related channel sensing procedures to perform during channel sensing, the first slot-related channel sensing procedure indicating time interval increments in which to perform the channel sensing. The operations of 1205 may be performed in accordance with examples as disclosed herein. In some examples, aspects of the operations of 1205 may be performed by a sensing procedure indication component 925 as described with reference to FIG. 9.

At 1210, the method may include performing, based on the indication, the first slot-related channel sensing procedure in the time interval increments of a sidelink resource pool to identify a first time-frequency resource of the sidelink resource pool that is available for transmission of a sidelink message. The operations of 1210 may be performed in accordance with examples as disclosed herein. In some examples, aspects of the operations of 1210 may be performed by a channel sensing component 930 as described with reference to FIG. 9.

At 1215, the method may include receiving, from a second UE during a sensing window monitored by the first slot-related channel sensing procedure, SCI that reserves a sub-slot of the sidelink resource pool. The operations of

1215 may be performed in accordance with examples as disclosed herein. In some examples, aspects of the operations of 1215 may be performed by an SCI component 940 as described with reference to FIG. 9.

At 1220, the method may include transmitting the sidelink message via the first time-frequency resource, where the sidelink message is transmitted using the first time-frequency resource that does not overlap with the sub-slot reserved by the SCI based on a received power of the SCI satisfying a threshold. The operations of 1220 may be performed in accordance with examples as disclosed herein. In some examples, aspects of the operations of 1220 may be performed by a sidelink message component 935 as described with reference to FIG. 9.

The following aspects are given by way of illustration. Examples of the following aspects may be combined with examples or embodiments shown or discussed in relation to the figures or elsewhere herein.

Aspect 1: A method for wireless communications at a UE, comprising: receiving an indication of a first slot-related channel sensing procedure of a plurality of available slot-related channel sensing procedures to perform during channel sensing, the first slot-related channel sensing procedure indicating time interval increments in which to perform the channel sensing; performing, based at least in part on the indication, the first slot-related channel sensing procedure in the time interval increments of a sidelink resource pool to identify a first time-frequency resource of the sidelink resource pool that is available for transmission of a sidelink message; and transmitting the sidelink message via the first time frequency resource.

Aspect 2: The method of aspect 1, wherein performing the first slot-related channel sensing procedure comprises: receiving, from a second UE during a sensing window monitored by the first slot-related channel sensing procedure, sidelink control information that reserves a sub-slot of the sidelink resource pool, wherein the sidelink message is transmitted using the first time frequency resource that does not overlap with the sub-slot reserved by the sidelink control information based at least in part on a received power of the sidelink control information satisfying a threshold.

Aspect 3: The method of aspect 2, further comprising: receiving an indication of a first priority associated with the sidelink message, wherein the threshold is based at least in part on the first priority associated with the sidelink message and a second priority associated with the sub-slot reserved by the sidelink control information.

Aspect 4: The method of any of aspects 1 through 3, wherein performing the first slot-related channel sensing procedure comprises: receiving, from a second UE during a sensing window monitored by the first slot-related channel sensing procedure, sidelink control information that reserves a sub-slot of the sidelink resource pool, wherein the sidelink message is transmitted via the first time frequency resource that does not overlap with a slot having a set of contiguous frequency resources that includes the sub-slot reserved by the sidelink control information.

Aspect 5: The method of any of aspects 1 through 3, wherein performing the first slot-related channel sensing procedure comprises: receiving, from a second UE during a sensing window monitored by the first slot-related channel sensing procedure, sidelink control information that reserves a slot of the sidelink resource pool, wherein the sidelink message is transmitted via the first time frequency resource that does not overlap with a sub-slot having a set of contiguous frequency resources that includes the slot reserved by the sidelink control information.

Aspect 6: The method of any of aspects 1 through 3, wherein performing the first slot-related channel sensing procedure comprises: receiving, from a second UE during a sensing window monitored by the first slot-related channel sensing procedure, sidelink control information that reserves a first sub-slot of the sidelink resource pool, wherein the sidelink message is transmitted via the first time frequency resource that does not overlap with a second sub-slot having a set of contiguous frequency resources that includes the first sub-slot reserved by the sidelink control information.

Aspect 7: The method of any of aspects 1 through 6, further comprising: receiving an indication of one or more parameters associated with the first slot-related channel sensing procedure, wherein the first slot-related channel sensing procedure is performed in response to receiving the indication of the one or more parameters.

Aspect 8: The method of aspect 7, wherein the one or more parameters include one or more of the sidelink resource pool that is available for transmission of the sidelink message, a priority associated with the sidelink message, a packet delay budget associated with the sidelink message, or a quantity of contiguous frequency resources to be used for transmission of the sidelink message.

Aspect 9: The method of any of aspects 1 through 8, wherein the first slot-related channel sensing procedure indicates, to the UE, to perform one of slot-based channel sensing or sub-slot-based channel sensing.

Aspect 10: An apparatus for wireless communications at a UE, comprising a processor; memory coupled with the processor; and instructions stored in the memory and executable by the processor to cause the apparatus to perform a method of any of aspects 1 through 9.

Aspect 11: An apparatus for wireless communications at a UE, comprising at least one means for performing a method of any of aspects 1 through 9.

Aspect 12: A non-transitory computer-readable medium storing code for wireless communications at a UE, the code comprising instructions executable by a processor to perform a method of any of aspects 1 through 9.

Examples of these aspects may be combined with aspects or embodiments disclosed in other implementations. It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
receiving an indication of a first slot-related channel sensing procedure of a plurality of available slot-related channel sensing procedures to perform during channel sensing within a sidelink resource pool, the first slot-related channel sensing procedure indicating time interval increments in which to perform the channel sensing within the sidelink resource pool, wherein the plurality of available slot-related channel sensing procedures comprises a mini-slot-based channel sensing procedure associated with performing the channel sensing according to a first time interval increment having a mini-slot length within the sidelink resource pool and a slot-based channel sensing procedure associated with performing the channel sensing according to a second time interval increment having a slot length within the sidelink resource pool;
monitoring, during the first slot-related channel sensing procedure and based at least in part on the indication, time and frequency resources of the sidelink resource pool in accordance with the time interval increments indicated by the first slot-related channel sensing procedure to identify a first time-frequency resource of the sidelink resource pool that is available for transmission of a sidelink message; and
transmitting the sidelink message via the first time-frequency resource.

2. The method of claim 1, wherein monitoring the time and frequency resources of the sidelink resource pool during the first slot-related channel sensing procedure comprises:
receiving, from a second UE during a sensing window monitored by the first slot-related channel sensing procedure, sidelink control information that reserves a sub-slot of the sidelink resource pool, wherein the sidelink message is transmitted using the first time-frequency resource that does not overlap with the sub-slot reserved by the sidelink control information based at least in part on a received power of the sidelink control information satisfying a threshold.

3. The method of claim 2, further comprising:
receiving an indication of a first priority associated with the sidelink message, wherein the threshold is based at least in part on the first priority associated with the sidelink message and a second priority associated with the sub-slot reserved by the sidelink control information.

4. The method of claim 1, wherein monitoring the time and frequency resources of the sidelink resource pool during the first slot-related channel sensing procedure comprises:
receiving, from a second UE during a sensing window monitored by the first slot-related channel sensing procedure, sidelink control information that reserves a sub-slot of the sidelink resource pool, wherein the sidelink message is transmitted via the first time-frequency resource that does not overlap with a slot having a set of contiguous frequency resources that includes the sub-slot reserved by the sidelink control information.

5. The method of claim 1, wherein monitoring the time and frequency resources of the sidelink resource pool during the first slot-related channel sensing procedure comprises:
receiving, from a second UE during a sensing window monitored by the first slot-related channel sensing procedure, sidelink control information that reserves a slot of the sidelink resource pool, wherein the sidelink message is transmitted via the first time-frequency resource that does not overlap with a sub-slot having a set of contiguous frequency resources that includes the slot reserved by the sidelink control information.

6. The method of claim 1, wherein monitoring the time and frequency resources of the sidelink resource pool during the first slot-related channel sensing procedure comprises:
receiving, from a second UE during a sensing window monitored by the first slot-related channel sensing procedure, sidelink control information that reserves a first sub-slot of the sidelink resource pool, wherein the sidelink message is transmitted via the first time-frequency resource that does not overlap with a second sub-slot having a set of contiguous frequency resources that includes the first sub-slot reserved by the sidelink control information.

7. The method of claim 1, further comprising:
receiving an indication of one or more parameters associated with the first slot-related channel sensing procedure, wherein the first slot-related channel sensing procedure is performed in response to receiving the indication of the one or more parameters.

8. The method of claim 7, wherein the one or more parameters include one or more of the sidelink resource pool that is available for transmission of the sidelink message, a priority associated with the sidelink message, a packet delay budget associated with the sidelink message, or a quantity of contiguous frequency resources to be used for transmission of the sidelink message.

9. The method of claim 1, wherein the first slot-related channel sensing procedure indicates, to the UE, to perform one of slot-based channel sensing associated with the first time interval increment having the slot length or sub-slot-based channel sensing associated with the first time interval increment having the mini-slot length.

10. An apparatus for wireless communications at a user equipment (UE), comprising:

a processor;

memory coupled with the processor; and instructions stored in the memory and executable by the processor to cause the apparatus to:

receive an indication of a first slot-related channel sensing procedure of a plurality of available slot-related channel sensing procedures to perform during channel sensing within a sidelink resource pool, the first slot-related channel sensing procedure indicating time interval increments in which to perform the channel sensing within the sidelink resource pool, wherein the plurality of available slot-related channel sensing procedures comprises a mini-slot-based channel sensing procedure associated with performing the channel sensing according to a first time interval increment having a mini-slot length within the sidelink resource pool and a slot-based channel sensing procedure associated with performing the channel sensing according to a second time interval increment having a slot length within the sidelink resource pool;

monitor, during the first slot-related channel sensing procedure and based at least in part on the indication, time and frequency resources of the sidelink resource pool in accordance with the time interval increments indicated by the first slot-related channel sensing procedure to identify a first time-frequency resource of the sidelink resource pool that is available for transmission of a sidelink message; and transmit the sidelink message via the first time-frequency resource.

11. The apparatus of claim 10, wherein the instructions to monitor the time and frequency resources of the sidelink resource pool during the first slot-related channel sensing procedure are executable by the processor to cause the apparatus to:

receive, from a second UE during a sensing window monitored by the first slot-related channel sensing procedure, sidelink control information that reserves a sub-slot of the sidelink resource pool, wherein the sidelink message is transmitted using the first time-frequency resource that does not overlap with the sub-slot reserved by the sidelink control information based at least in part on a received power of the sidelink control information satisfying a threshold.

12. The apparatus of claim 11, wherein the instructions are further executable by the processor to cause the apparatus to:

receive an indication of a first priority associated with the sidelink message, wherein the threshold is based at least in part on the first priority associated with the sidelink message and a second priority associated with the sub-slot reserved by the sidelink control information.

13. The apparatus of claim 10, wherein the instructions to monitor the time and frequency resources of the sidelink resource pool during the first slot-related channel sensing procedure are executable by the processor to cause the apparatus to:

receive, from a second UE during a sensing window monitored by the first slot-related channel sensing procedure, sidelink control information that reserves a sub-slot of the sidelink resource pool, wherein the sidelink message is transmitted via the first time-frequency resource that does not overlap with a slot having a set of contiguous frequency resources that includes the sub-slot reserved by the sidelink control information.

14. The apparatus of claim 10, wherein the instructions to monitor the time and frequency resources of the sidelink resource pool during the first slot-related channel sensing procedure are executable by the processor to cause the apparatus to:

receive, from a second UE during a sensing window monitored by the first slot-related channel sensing procedure, sidelink control information that reserves a slot of the sidelink resource pool, wherein the sidelink message is transmitted via the first time-frequency resource that does not overlap with a sub-slot having a set of contiguous frequency resources that includes the slot reserved by the sidelink control information.

15. The apparatus of claim 10, wherein the instructions to monitor the time and frequency resources of the sidelink resource pool during the first slot-related channel sensing procedure are executable by the processor to cause the apparatus to:

receive, from a second UE during a sensing window monitored by the first slot-related channel sensing procedure, sidelink control information that reserves a first sub-slot of the sidelink resource pool, wherein the sidelink message is transmitted via the first time-frequency resource that does not overlap with a second sub-slot having a set of contiguous frequency resources that includes the first sub-slot reserved by the sidelink control information.

16. The apparatus of claim 10, wherein the instructions are further executable by the processor to cause the apparatus to:

receive an indication of one or more parameters associated with the first slot-related channel sensing procedure, wherein the first slot-related channel sensing procedure is performed in response to receiving the indication of the one or more parameters.

17. The apparatus of claim 16, wherein the one or more parameters include one or more of the sidelink resource pool that is available for transmission of the sidelink message, a priority associated with the sidelink message, a packet delay budget associated with the sidelink message, or a quantity of contiguous frequency resources to be used for transmission of the sidelink message.

18. The apparatus of claim 10, wherein the first slot-related channel sensing procedure indicates, to the UE, to perform one of slot-based channel sensing associated with the first time interval increment having the slot length or sub-slot-based channel sensing associated with the first time interval increment having the mini-slot length.

19. An apparatus for wireless communications at a user equipment (UE), comprising:

means for receiving an indication of a first slot-related channel sensing procedure of a plurality of available slot-related channel sensing procedures to perform during channel sensing within a sidelink resource pool, the first slot-related channel sensing procedure indicating time interval increments in which to perform the channel sensing within the sidelink resource pool, wherein the plurality of available slot-related channel sensing procedures comprises a mini-slot-based channel sensing procedure associated with performing the channel sensing according to a first time interval increment having a mini-slot length within the sidelink resource pool and a slot-based channel sensing procedure associated with performing the channel sensing according to a second time interval increment having a slot length within the sidelink resource pool;

means for monitoring, during the first slot-related channel sensing procedure and based at least in part on the indication, time and frequency resources of the sidelink resource pool in accordance with the time interval increments indicated by the first slot-related channel sensing procedure to identify a first time-frequency resource of the sidelink resource pool that is available for transmission of a sidelink message; and means for transmitting the sidelink message via the first time-frequency resource.

20. The apparatus of claim 19, wherein the means for monitoring the time and frequency resources of the sidelink resource pool during the first slot-related channel sensing procedure comprise:

means for receiving, from a second UE during a sensing window monitored by the first slot-related channel sensing procedure, sidelink control information that reserves a sub-slot of the sidelink resource pool, wherein the sidelink message is transmitted using the first time-frequency resource that does not overlap with the sub-slot reserved by the sidelink control information based at least in part on a received power of the sidelink control information satisfying a threshold.

21. The apparatus of claim 20, further comprising:

means for receiving an indication of a first priority associated with the sidelink message, wherein the threshold is based at least in part on the first priority associated with the sidelink message and a second priority associated with the sub-slot reserved by the sidelink control information.

22. The apparatus of claim 19, wherein the means for monitoring the time and frequency resources of the sidelink resource pool during the first slot-related channel sensing procedure comprise:

means for receiving, from a second UE during a sensing window monitored by the first slot-related channel sensing procedure, sidelink control information that reserves a sub-slot of the sidelink resource pool, wherein the sidelink message is transmitted via the first time-frequency resource that does not overlap with a slot having a set of contiguous frequency resources that includes the sub-slot reserved by the sidelink control information.

23. The apparatus of claim 19, wherein the means for monitoring the time and frequency resources of the sidelink resource pool during the first slot-related channel sensing procedure comprise:

means for receiving, from a second UE during a sensing window monitored by the first slot-related channel sensing procedure, sidelink control information that reserves a slot of the sidelink resource pool, wherein the sidelink message is transmitted via the first time-frequency resource that does not overlap with a sub-slot having a set of contiguous frequency resources that includes the slot reserved by the sidelink control information.

24. The apparatus of claim 19, wherein the means for monitoring the time and frequency resources of the sidelink resource pool during the first slot-related channel sensing procedure comprise:

means for receiving, from a second UE during a sensing window monitored by the first slot-related channel sensing procedure, sidelink control information that reserves a first sub-slot of the sidelink resource pool, wherein the sidelink message is transmitted via the first time-frequency resource that does not overlap with a second sub-slot having a set of contiguous frequency resources that includes the first sub-slot reserved by the sidelink control information.

25. The apparatus of claim 19, further comprising:

means for receiving an indication of one or more parameters associated with the first slot-related channel sensing procedure, wherein the first slot-related channel sensing procedure is performed in response to receiving the indication of the one or more parameters.

26. The apparatus of claim 25, wherein the one or more parameters include one or more of the sidelink resource pool that is available for transmission of the sidelink message, a priority associated with the sidelink message, a packet delay budget associated with the sidelink message, or a quantity of contiguous frequency resources to be used for transmission of the sidelink message.

27. The apparatus of claim 19, wherein the first slot-related channel sensing procedure indicates, to the UE, to perform one of slot-based channel sensing associated with the first time interval increment having the slot length or sub-slot-based channel sensing associated with the first time interval increment having the mini-slot length.

28. A non-transitory computer-readable medium storing code for wireless communications at a user equipment (UE), the code comprising instructions executable by a processor to:

receive an indication of a first slot-related channel sensing procedure of a plurality of available slot-related channel sensing procedures to perform during channel sensing within a sidelink resource pool, the first slot-related channel sensing procedure indicating time interval increments in which to perform the channel sensing within the sidelink resource pool, wherein the plurality of available slot-related channel sensing procedures comprises a mini-slot-based channel sensing procedure associated with performing the channel sensing according to a first time interval increment having a mini-slot length within the sidelink resource pool and a slot-based channel sensing procedure associated with performing the channel sensing according to a second time interval increment having a slot length within the sidelink resource pool;

monitor, based at least in part on the indication, time and frequency resources of the sidelink resource pool in accordance with the time interval increments indicated by the first slot-related channel sensing procedure to identify a first time-frequency resource of the sidelink resource pool that is available for transmission of a sidelink message; and transmit the sidelink message via the first time-frequency resource.

29. The non-transitory computer-readable medium of claim 28, wherein the instructions to monitor the time and frequency resources of the sidelink resource pool during the first slot-related channel sensing procedure are executable by the processor to: receive, from a second UE during a sensing window monitored by the first slot-related channel sensing procedure, sidelink control information that reserves a sub-slot of the sidelink resource pool, wherein the sidelink message is transmitted using the first time-frequency resource that does not overlap with the sub-slot reserved by the sidelink control information based at least in part on a received power of the sidelink control information satisfying a threshold.

30. The non-transitory computer-readable medium of claim 29, wherein the instructions are further executable by the processor to:

receive an indication of a first priority associated with the sidelink message, wherein the threshold is based at least in part on the first priority associated with the sidelink message and a second priority associated with the sub-slot reserved by the sidelink control information.

\* \* \* \* \*